(12) United States Patent
Blackburn

(10) Patent No.: US 10,154,729 B2
(45) Date of Patent: Dec. 18, 2018

(54) ARTICULATING ERGONOMIC SUPPORT ARM

(71) Applicant: Knape & Vogt Manufacturing Company, Grand Rapids, MI (US)

(72) Inventor: Nicholas Leonard Blackburn, Wellesley (CA)

(73) Assignee: Knape & Vogt Manufacturing Company, Grand Rapids, MI (US)

( * ) Notice: Subject to any disclaimer, the term of this patent is extended or adjusted under 35 U.S.C. 154(b) by 30 days.

(21) Appl. No.: 15/585,751

(22) Filed: May 3, 2017

(65) Prior Publication Data

US 2017/0325584 A1    Nov. 16, 2017

Related U.S. Application Data

(60) Provisional application No. 62/334,184, filed on May 10, 2016.

(51) Int. Cl.
| | |
|---|---|
| *A47B 21/02* | (2006.01) |
| *F16M 13/02* | (2006.01) |
| *A47B 21/04* | (2006.01) |
| *A47B 21/03* | (2006.01) |

(52) U.S. Cl.
CPC .............. *A47B 21/02* (2013.01); *A47B 21/04* (2013.01); *F16M 13/02* (2013.01); *A47B 2021/035* (2013.01); *A47B 2021/0328* (2013.01); *F16M 2200/021* (2013.01); *F16M 2200/063* (2013.01)

(58) Field of Classification Search
CPC ........... A47B 21/02; B66F 3/22; B66F 11/042
USPC .............. 108/145; 248/277.1; 254/126
See application file for complete search history.

(56) References Cited

U.S. PATENT DOCUMENTS

| | | | |
|---|---|---|---|
| 741,382 A | 10/1903 | Seifried | |
| 783,383 A | 2/1905 | Olson | |
| 899,769 A | 9/1908 | Tideman | |
| 1,318,564 A * | 10/1919 | Jenkins | A47B 9/00 108/145 |
| 2,545,515 A * | 3/1951 | Mast | A47B 9/00 108/138 |
| 3,857,548 A * | 12/1974 | Takeuchi | B66F 3/12 254/126 |
| 4,371,222 A | 2/1983 | Gorkiewicz | |
| 4,546,708 A | 10/1985 | Wilburth | |
| 4,589,621 A | 5/1986 | Hunt et al. | |
| 4,607,578 A * | 8/1986 | Inoue | B23P 19/00 108/145 |
| 4,616,798 A | 10/1986 | Smeenge et al. | |

(Continued)

*Primary Examiner* — Jose V Chen
(74) *Attorney, Agent, or Firm* — Cook Alex Ltd.

(57) ABSTRACT

An articulating support arm includes a base, a first set of control arms having proximal ends and distal ends, with the proximal ends of the first set of control arms being pivotally connected to the base. The support arm further includes a second set of control arms having proximal ends and distal ends, with the proximal ends of the second set of control arms being disposed forward of and pivotally connected to the distal ends of the first set of control arms. The distal ends of the second set of control arms also are pivotally connected to a control head, and a locking assembly selectively prevents pivotal movement of the control arms, so as to provide vertical adjustment of the control head relative to the base.

34 Claims, 25 Drawing Sheets

(56) References Cited

U.S. PATENT DOCUMENTS

| | | |
|---|---|---|
| 4,624,437 A * | 11/1986 | Sakamoto .............. B60N 2/502 108/145 |
| 4,691,888 A | 9/1987 | Cotterill |
| 4,706,919 A | 11/1987 | Soberalski et al. |
| 4,776,284 A | 10/1988 | McIntosh |
| 4,826,123 A | 5/1989 | Hannah et al. |
| 4,988,066 A | 1/1991 | Cotterill |
| 5,012,879 A * | 5/1991 | Bienek ...................... B66F 3/12 180/313 |
| 5,037,054 A | 8/1991 | McConnell |
| 5,176,362 A * | 1/1993 | Seksaria ................... B66F 3/12 254/126 |
| 5,211,367 A | 5/1993 | Musculus |
| 5,230,289 A | 7/1993 | George et al. |
| 5,257,767 A | 11/1993 | McConnell |
| 5,302,015 A | 4/1994 | Du Vall |
| 5,311,210 A | 5/1994 | O'Brien et al. |
| 5,513,579 A | 5/1996 | Allan |
| 5,564,667 A | 10/1996 | Copeland et al. |
| 5,584,596 A | 12/1996 | Greene |
| 5,673,628 A * | 10/1997 | Boos ...................... B60N 3/001 108/138 |
| 5,697,303 A | 12/1997 | Allan |
| 5,791,263 A | 8/1998 | Watt et al. |
| 5,839,373 A | 11/1998 | Lin |
| 5,878,674 A | 3/1999 | Allan |
| 5,881,984 A | 3/1999 | Lin |
| 5,901,933 A | 5/1999 | Lin |
| 5,924,664 A | 7/1999 | Mileos et al. |
| 5,924,666 A | 7/1999 | Liu |
| 5,927,662 A | 7/1999 | West et al. |
| 6,012,693 A | 1/2000 | Voeller et al. |
| 6,021,985 A | 2/2000 | Hahn |
| 6,027,090 A | 2/2000 | Liu |
| 6,076,785 A | 6/2000 | Oddsen, Jr. |
| 6,116,557 A | 9/2000 | Choy et al. |
| 6,135,404 A | 10/2000 | Wisniewski et al. |
| 6,176,456 B1 | 1/2001 | Wisniewski et al. |
| 6,186,460 B1 | 2/2001 | Lin |
| 6,199,809 B1 | 3/2001 | Hung |
| 6,227,508 B1 | 5/2001 | Panzarella et al. |
| 6,257,538 B1 | 7/2001 | Pangborn et al. |
| 6,270,047 B1 | 8/2001 | Hudson |
| 6,273,382 B1 | 8/2001 | Pemberton |
| 6,322,031 B1 | 11/2001 | LeClair et al. |
| 6,336,618 B1 | 1/2002 | Barber |
| 6,343,775 B1 | 2/2002 | Jones et al. |
| 6,397,763 B1 | 6/2002 | Panzarella et al. |
| 6,398,176 B1 | 6/2002 | Liu |
| 6,409,127 B1 | 6/2002 | VanderHeide et al. |
| 6,450,467 B2 | 9/2002 | Timm |
| 6,460,816 B1 | 10/2002 | Barber |
| 6,478,279 B1 | 11/2002 | Barber |
| 6,481,683 B1 | 11/2002 | Stewart et al. |
| 6,488,248 B1 | 12/2002 | Watt et al. |
| 6,523,797 B2 | 2/2003 | LeClair et al. |
| 6,527,235 B1 | 3/2003 | Cotterill |
| 6,533,229 B1 | 3/2003 | Hung |
| 6,565,055 B1 | 5/2003 | Timm |
| 6,565,056 B2 | 5/2003 | Lin |
| 6,598,844 B2 | 7/2003 | Barber |
| 6,601,812 B2 | 8/2003 | LeClair et al. |
| 6,631,687 B2 | 10/2003 | Knighton |
| 6,655,646 B2 | 12/2003 | Johnson |
| 6,726,168 B2 | 4/2004 | Barber |
| 6,786,461 B1 | 9/2004 | Tsai et al. |
| 6,799,749 B1 | 10/2004 | Voegeli, Jr. et al. |
| 6,877,707 B1 | 4/2005 | Jones et al. |
| 6,883,764 B1 | 4/2005 | Mileos et al. |
| 6,905,101 B1 | 6/2005 | Dittmer |
| 6,905,102 B2 | 6/2005 | Lin |
| 6,929,228 B2 | 8/2005 | Whitaker et al. |
| 6,969,792 B2 | 11/2005 | Wang |
| 6,971,624 B2 | 12/2005 | Kollar et al. |
| 7,004,438 B2 | 2/2006 | Lin |
| 7,028,971 B2 | 4/2006 | Scott |
| 7,044,425 B2 | 5/2006 | Jones et al. |
| 7,048,236 B2 | 5/2006 | Benden et al. |
| 7,188,813 B2 | 3/2007 | Kollar |
| 7,198,239 B2 | 4/2007 | Mileos et al. |
| 7,303,173 B2 | 12/2007 | Mileos |
| 7,398,950 B2 | 7/2008 | Hung |
| 7,487,943 B1 | 2/2009 | Gillespie |
| 7,523,905 B2 | 4/2009 | Timm et al. |
| 7,566,039 B2 | 7/2009 | Hung |
| 7,571,883 B2 | 8/2009 | Van Groesen et al. |
| 7,637,468 B2 | 12/2009 | Huang |
| 7,841,049 B2 | 11/2010 | Wang |
| 7,841,569 B2 | 11/2010 | Mileos et al. |
| 7,841,570 B2 | 11/2010 | Mileos et al. |
| 7,866,622 B2 | 1/2011 | Dittmer |
| 7,950,338 B2 | 5/2011 | Smed |
| 7,988,113 B2 | 8/2011 | Yang et al. |
| 8,072,739 B2 | 12/2011 | Dittmer |
| 8,094,438 B2 | 1/2012 | Dittmer et al. |
| 8,490,934 B2 | 7/2013 | Dittmer |
| 8,508,918 B2 | 8/2013 | Dittmer et al. |
| 8,837,127 B2 | 9/2014 | Dittmer et al. |
| 8,864,091 B1 | 10/2014 | Patriarco |
| 9,004,430 B2 | 4/2015 | Conner |
| 9,062,816 B2 | 6/2015 | Kulkarni et al. |
| 9,441,784 B2 * | 9/2016 | Russell .................. A47B 17/03 |
| 2001/0015425 A1 * | 8/2001 | Garceau .................... B66F 3/12 254/126 |
| 2006/0186294 A1 * | 8/2006 | Van Groesen ......... F16M 11/08 248/284.1 |
| 2007/0023599 A1 | 2/2007 | Fedewa |
| 2009/0159768 A1 | 6/2009 | Oh |
| 2011/0291060 A1 * | 12/2011 | Garceau .................... B66F 3/12 254/122 |
| 2013/0032682 A1 | 2/2013 | Bell |
| 2015/0250315 A1 | 9/2015 | Gross et al. |

\* cited by examiner

Section A - A

Section B - B

ARTICULATING ERGONOMIC SUPPORT ARM

CROSS-REFERENCE TO RELATED APPLICATION

This application claims the benefit of U.S. Provisional Patent Application No. 62/334,184, filed May 10, 2016, the disclosure of which is hereby incorporated by reference in its entirety.

FIELD OF THE DISCLOSURE

This disclosure is directed to an articulating support arm that may be coupled to a workstation, such as to the lower surface of a desktop or tabletop, for use with a data entry/input device, such as a computer keyboard or mouse. The support arm also features significant vertical adjustment, which makes it ideally suited for use in a sit-stand work arrangement.

BACKGROUND

Various adjustable devices that support computer keyboards have been provided for use in sitting or standing arrangements at a workstation. Indeed, there are products that are marketed as being adjustable for use in a sitting or standing position. Such sit-stand products may include a height adjustable entire desktop area or a keyboard support tray that is adjustable from a position resting atop a workstation, such as a desktop or tabletop, to a raised position for use while standing. However, these devices tend to be relatively simple structures that have a large footprint. As such, they take up much of the work surface and are not able to be conveniently stored below the work surface of the workstation.

Other support arms that are capable of use in a sit-stand arrangement seek to provide a range of vertical adjustability while being mounted to an underside of a work surface of a workstation, directly or slidably on a track. Unfortunately, it is common for such sit-stand support arms to have a large, long curved neck, which is intended to extend forward and upward, so as to reach outward and in front of the workstation. However, this causes such support arms to be unable to be fully or compactly stored under a workstation having a common configuration. As a result, when the support arm is in its storage position and a user is seated, the support arm may tend to protrude forward or well below the work surface and may cause an obstruction and/or discomfort for the user's torso or legs.

In light of the intended use of one or more support surfaces provided with an articulating ergonomic support arm, such as for typing on a keyboard and/or operating a mouse on an associated mouse pad, difficulties can arise with respect to providing smooth, stable operation. The need to provide a support arm at a reasonable cost, while having quality vertical adjustment and sufficient strength to endure the Business+Institutional Furniture Manufacturers Association (BIFMA) static load testing, raises additional considerations. Existing products do not tend to provide a stable, articulating ergonomic support arm having advantageous vertical adjustability, and a compact storage position under a workstation.

SUMMARY

In a first aspect, the present disclosure provides an articulating support arm that includes a base, a first set of control arms having proximal ends and distal ends, with the proximal ends of the first set of control arms being pivotally connected to the base. The support arm further includes a second set of control arms having proximal ends and distal ends, with the proximal ends of the second set of control arms being disposed forward of and pivotally connected to the distal ends of the first set of control arms. The distal ends of the second set of control arms also are pivotally connected to a control head, and a locking assembly selectively prevents pivotal movement of the control arms, so as to provide vertical adjustment of the control head relative to the base.

The support arm first set of control arms may include two or more control arms with at least two control arms having gear teeth that mesh one to the other to control the symmetry within a vertical plane as the support arm is moved vertically. The second set of control arms may include two or more control arms with at least two control arms having gear teeth on their distal ends that are meshed to each other where they are connected to a control head. The connected two sets of control arms generally form a diamond shape. Each of the at least six connections, at the ends of the respective control arms, move freely about a respective pivot shaft, provided for example by a bolt or pin, when the support arm is being vertically adjusted.

While the articulating ergonomic support arm could be constructed with a fixed angle for use of the platform relative to a horizontal plane or to the base, it is preferable to provide for tilt adjustment of the platform to provide improved user comfort. For instance, the preferred examples are shown with a platform that is pivotally connected to the control head and includes a tilt adjustment assembly by which the platform is selectively tiltable relative to the control head. In the preferred examples, the tilt adjustment assembly includes the platform having an angled abutment that engages a slider extending between the abutment and a shaft that is rotatably connected to the control head, with the slider being rotatably connected to and driven by the shaft. A knob is connected to the shaft and as the knob and shaft are rotated, the slider is driven across the abutment surface, which, in turn, causes the angle or inclination of the platform relative to a horizontal plane and to the control head to be adjusted. Yet, it will be appreciated that other components may be utilized to achieve and maintain tilt adjustment, such as clamping or locking mechanisms, or other suitable components.

In another aspect, the present disclosure provides an articulating ergonomic support arm that provides for selective vertical adjustment of the control head relative to the base, including the control head being in at least respective positions disposed above, below and aligned with the base. A locking assembly holds the control head and platform in a selected vertical position, such as at a fully raised position, a fully lowered position or somewhere therebetween. The preferred examples include a platform that is pivotally connected to the control head and the front edge of the platform may be raised, by pivoting the platform relative to the control head. This movement releases the locking assembly and permits vertical movement and adjustment of the control head relative to the base. The locking assembly includes a plunger that is pivotally connected to the platform at a position spaced from the pivotal connection of the platform to the control head. The plunger is used to engage or disengage brake elements. When engaged, the brake elements resist pivotal movement of the control arms that are pivotally connected to the control head, thereby locking the support arm in a position within its range of vertical travel. When the front edge of the platform is raised, the plunger disengages the brake elements and permits vertical movement of the control head.

The disclosure provides preferred embodiments, as but two examples of configurations of an articulating ergonomic support arm that provides a compact design having a base that may be coupled to a workstation, which may be in various forms, such as a table, desk, shelf, credenza or the like. The support arm advantageously also is able to achieve a compact, storage position. Indeed, the support arm is movable to a neutral position wherein the control head is aligned with the base and the general diamond configuration of the pivotally connected control arms has been flattened to the point that the two sets of control arms are collinear. If the support arm is mounted on a slidable track, then from this position the support arm is ready to be moved rearward to a storage position underneath the workstation. This provides a compact, high storage configuration below the work surface that permits a user to sit with the user's legs comfortably beneath the fully retracted articulating ergonomic support arm and workstation.

The support arm may, but need not be pivotally connected to a workstation. The connection may be by a swivel plate, permitting the support arm to swivel to the left or right. The plate may, but need not be slidably connected to a track to slide to a rearward fully retracted position that is sufficiently rearward to be completely below the work surface of the workstation. The support arm provides a very compact configuration that is centered in front of the user and that may be extended forward and then vertically moved upward, downward or to a neutral position aligned with the base for use. It will be appreciated that the support arm includes a platform that may be tiltable. In turn, a keyboard support tray, with or without an associated mouse support, or another more expansive work surface may be connected to the platform, so as to provide adequate surface area to support one or more data entry/input devices of different sizes.

These and other objects, advantages, and features of the disclosure will be set forth in the detailed description which follows.

BRIEF DESCRIPTION OF THE DRAWINGS

In describing the preferred examples, references are made to the accompanying drawing figures wherein like parts have like reference numerals, and wherein.

Figure 1:
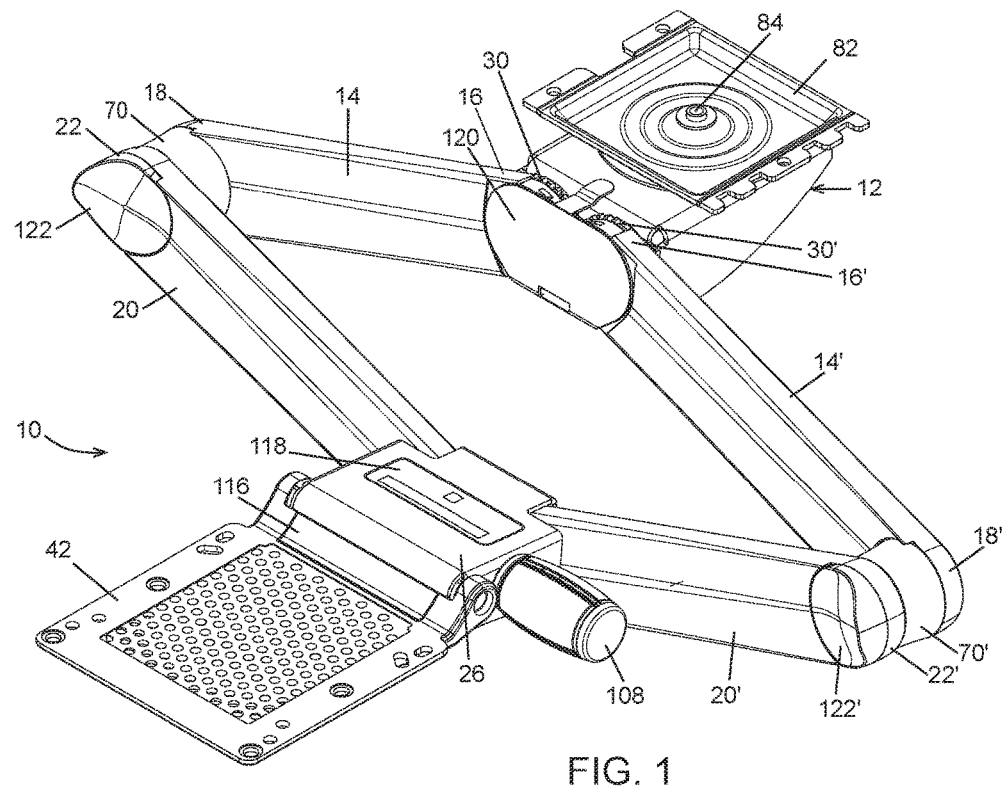
FIG. 1 is front upper perspective view of a first example embodiment of an articulating support arm in a lowered position.

It should be understood that the drawings are not necessarily to scale. While some mechanical details of articulating ergonomic support arms, including some details of fastening or connecting means and other plan and section views of the particular components have been omitted, such details are considered within the comprehension of those skilled in the art in light of the present disclosure. It also should be understood that the present disclosure is not limited to the examples illustrated.

DETAILED DESCRIPTION OF THE PREFERRED EMBODIMENTS

This disclosure presents examples of apparatus and methods of using the same, which may be embodied in several forms. For instance, within FIGS. 1-29 a first preferred example articulating ergonomic support arm is shown, as will be described further herein. It will be appreciated, however, that the invention may be constructed and configured in various ways, with a second preferred example shown in FIGS. 30-36, and the invention is not limited to the examples disclosed in the form of the preferred embodiments shown and described herein.

A first example embodiment of an articulating support arm 10 is shown in several perspective, front, top and side views within FIGS. 1-10. A perspective partially exploded view is provided in FIG. 11, while additional more specific components and features are shown in FIGS. 12-29. Turning to FIGS. 1-20, the articulating ergonomic support arm 10 includes a base 12. The support arm 10 also includes a first set of control arms 14, 14' having proximal ends 16, 16' and distal ends 18, 18', with the proximal ends 16, 16' of the first set of control arms 14, 14' being pivotally connected to the base 12. The support arm 10 further includes a second set of control arms 20, 20' having proximal ends 22, 22' and distal ends 24, 24', with the proximal ends 22, 22' of the second set of control arms 20, 20' being disposed forward of and pivotally connected to the distal ends 18, 18' of the first set of control arms 14, 14'. The distal ends 24, 24' of the second set of control arms 20, 20' are pivotally connected to a control head 26. The support arm 10 also includes a locking assembly 28 that selectively prevents pivotal movement of the control arms 14, 14', 20, 20', so as to provide vertical adjustment of the control head 26 relative to the base 12.

The base 12 and control head 26 are constructed of rigid materials, such as sheet or die cast metal, or molded plastic. Each set of control arms must include at least two control arms. The control arms 14, 14', 20, 20' also are constructed of rigid materials, such as die cast metal or molded plastic, or as will be described further herein, a combination of materials. For advantageous cost and manufacturing considerations, as shown and described further herein, the sets of control arms ideally share a common structural body. However, it will be appreciated that each of these components may be constructed in various ways, whether as multiple components connected together or as an integral component.

As best seen in FIGS. 1, 11-12, 21 and 24, the proximal ends 16, 16' of the first set of control arms 14, 14' further include radially positioned teeth 30, 30', with an intermeshing of the teeth 30, 30' of the respective proximal ends 16, 16' of the first set of control arms 14, 14'. With the proximal ends 16, 16' of the first set of control arms 14, 14' being pivotally connected to the base 12, the intermeshing of the teeth 30, 30' keeps the first set of control arms 14, 14' in registry with each other, helping to control the symmetry and plane during movement of the first set of control arms 14, 14'. In addition, as best seen in FIGS. 10-11, 13 and 14, the distal ends 24, 24' of the second set of control arms 20, 20' include radially positioned teeth 32, 32', with an intermeshing of the teeth 32, 32' of the respective distal ends 24, 24' of the second set of control arms 20, 20'. With the distal ends 24, 24' of the second set of control arms 20, 20' being pivotally connected to the control head 26, the intermeshing of the teeth 32, 32' keeps the second set of control arms 20, 20' in registry with each other, similarly helping to control the symmetry and plane during movement of the second set of control arms 20, 20'. Depending on the position of the control head 26 relative to the base 12, the control arms 14, 14', 20, 20' together generally form a diamond shape. As seen in FIGS. 1-10, however, vertical adjustment of the control head 26 relative to the base 12 of the support arm 10 includes the control head 26 being in at least respective positions disposed above, below and aligned with the base 12.

The radially positioned teeth 30, 30' on the proximal ends 16, 16' of the first set of control arms 14, 14' include at least a sector of radially positioned teeth. Additionally, the radially positioned teeth 32, 32' on the distal ends 24, 24' of the second set of control arms 20, 20' include at least a sector of radially positioned teeth. The respective radially positioned teeth may be integrally formed teeth on the respective ends of the control arms, as shown, or alternatively may be constructed as separate rings of teeth, or portions of rings of teeth, that may be connected to the appropriate respective ends of the control arms.

As will be appreciated from FIGS. 13-16 and 18-19, the locking assembly 28 of the support arm 10 includes brake elements 34, 34' on the distal ends 24, 24' of the second set of control arms 20, 20', with the brake elements 34, 34' being forward facing. The brake elements 34, 34' also selectively engage brake elements 36, 36' that are coupled to the control head 26, with the brake elements 36, 36' being rearward facing and located on a plunger 40 that is coupled to the control head 26. In this example, a platform 42 is pivotally connected at apertures 44 to the control head 26 at aperture 29 by a laterally extending pivot shaft 43, in the form of a pin. In turn, the plunger 40 at apertures 41 is pivotally connected to the platform 42 by a laterally extending pivot shaft 45, in the form of a pin. The pins may be held in place by use push nuts, retaining rings or other fasteners. It will be appreciated that the pivotal connections also could be provided by different constructions. In addition, the pivotal connection of the plunger 40 to the platform 42 is located at a position spaced from the pivotal connection of the platform 42 to the control head 26. In this way, the plunger 40 and its rearward facing brake elements 36, 36' are coupled to the control head 26.

Figure 18:
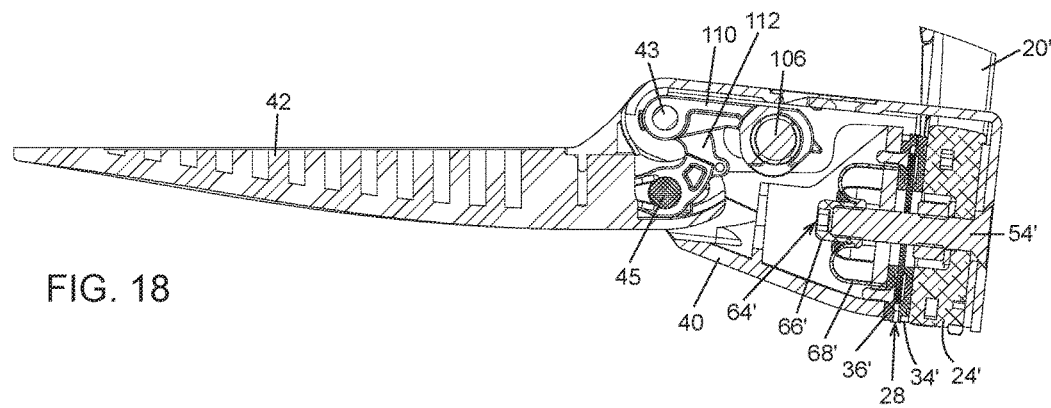
FIG. 18 is a closer view of the side cross-section view through the control head and platform of the example articulating support arm shown in FIG. 17.
Figure 19:
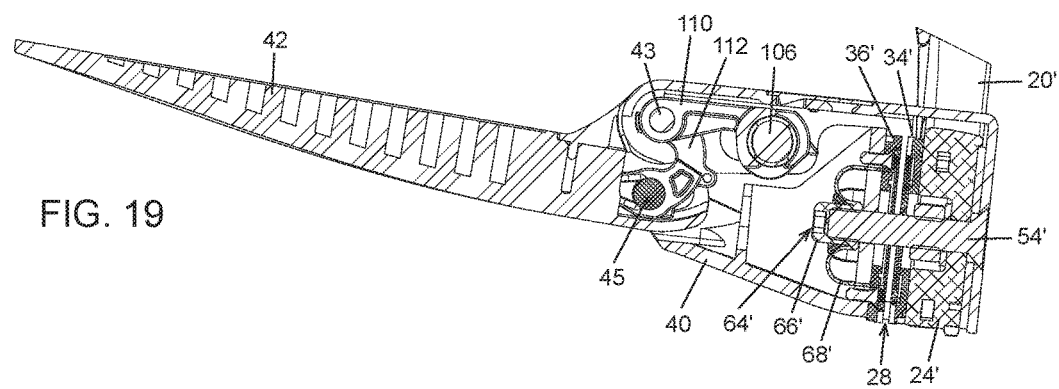
FIG. 19 shows the side cross-section view through the control head and platform of FIG. 18, but with the platform front edge raised, so as to pull the plunger forward and unlock the brake elements.
Figure 20:
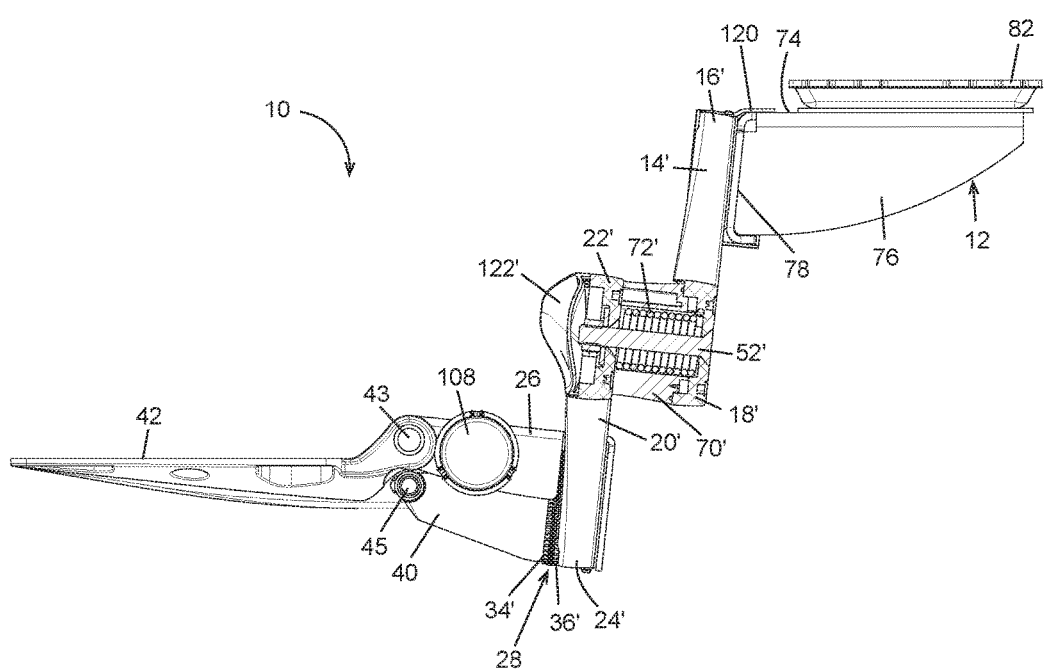
FIG. 20 is a side cross-section view through the pivotal connection of a distal end of a control arm of the first set of control arms and the proximal end of a control arm of the second set of control arms of the example articulating support arm shown in FIG. 8 in the lowered position.
Figure 21:
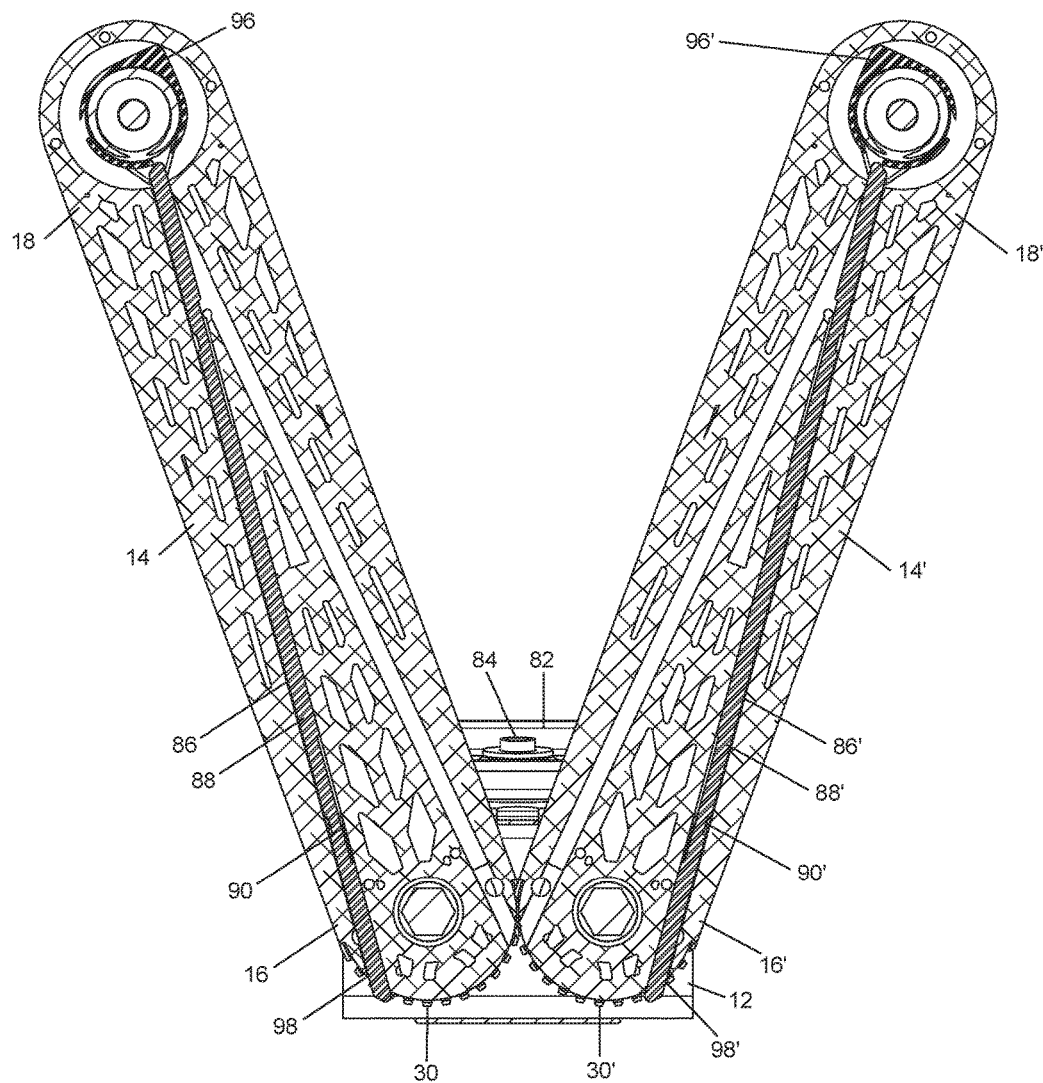
FIG. 21 is a front cross-section view through the first set of control arms when in the raised position shown in FIG. 6.
Figure 22:
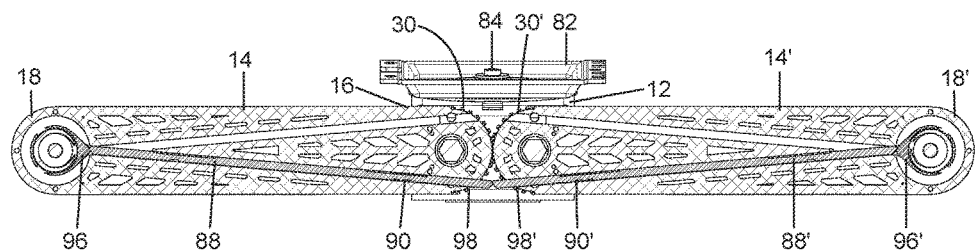
FIG. 22 is a front cross-section view through the first set of control arms when in the aligned or neutral position shown in FIG. 5.
Figure 23:
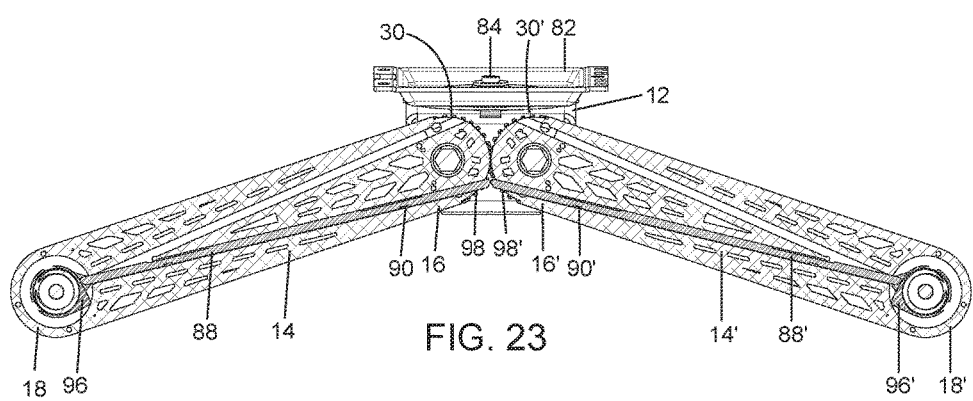
FIG. 23 is a front cross-section view through the first set of control arms at Section A-A when in the lowered position shown in FIG. 17.
Figure 24:
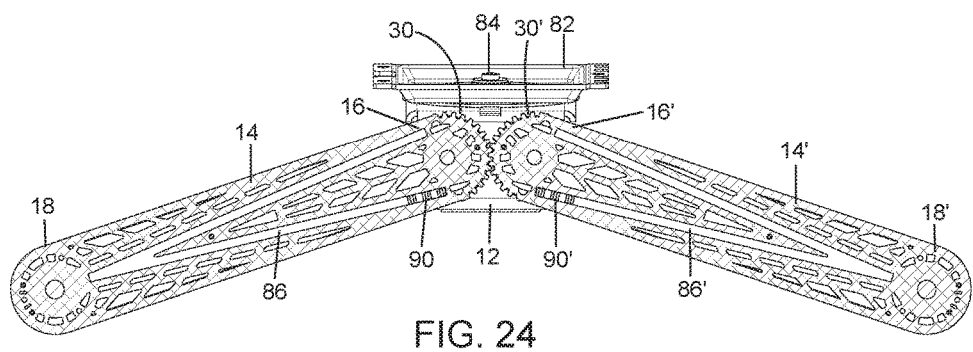
FIG. 24 is a front cross-section view through the first set of control arms at Section B-B when in the lowered position shown in FIG. 17.
Figure 25:
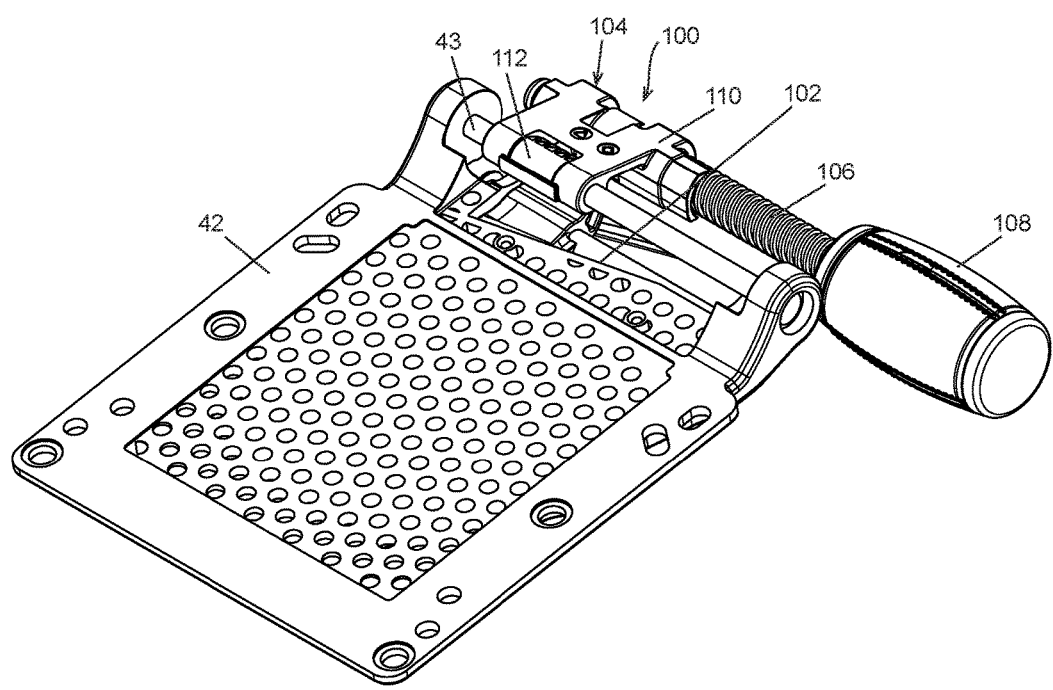
FIG. 25 is a front upper perspective view of the platform and a portion of the tilt adjustment mechanism of the example articulating support arm shown in FIG. 1.
Figures 26, 27:
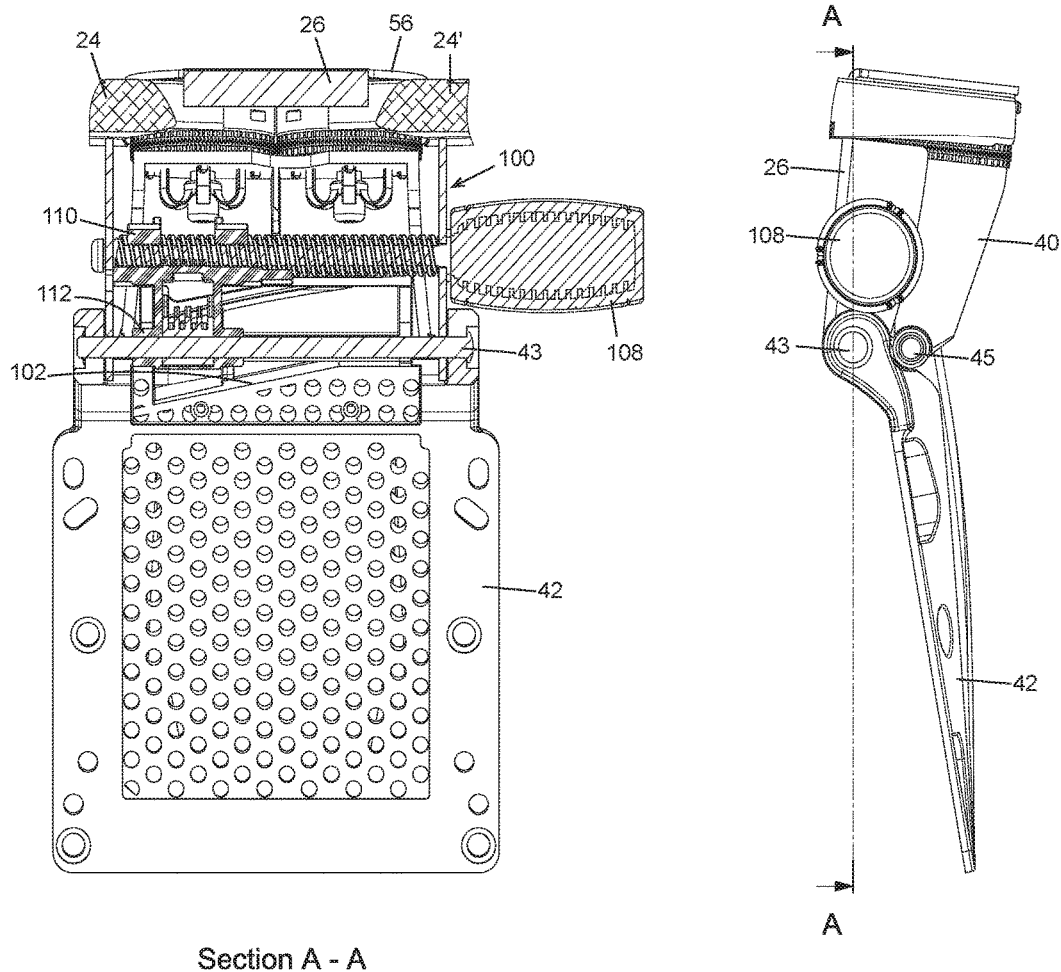
FIG. 26 is a top partial cross-section view through the control head, plunger, tilt mechanism and a portion of the platform at Section C-C of those components of the example articulating support arm shown in FIG. 27.
FIG. 27 is a side view of the control head, plunger, tilt mechanism and platform with a Section C-C through those components of the example articulating support arm shown in FIG. 9.
Figure 28:
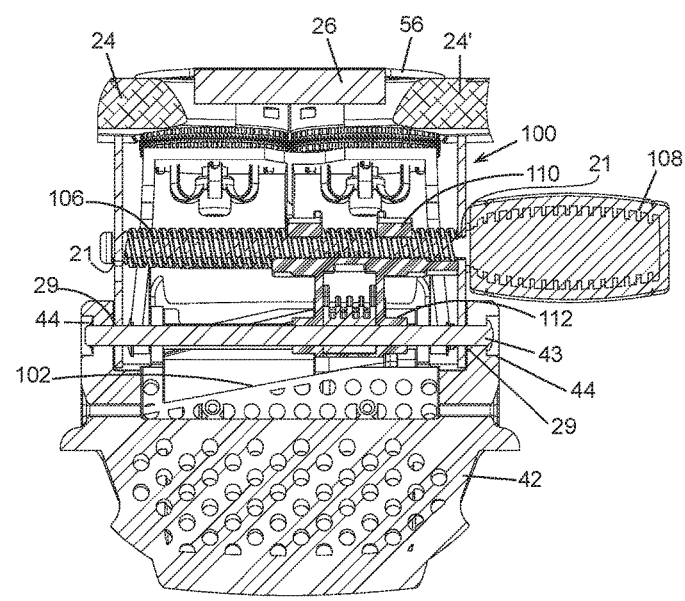
FIG. 28 is a top partial cross-section view through the control head, plunger, tilt mechanism and a portion of the platform at Section C-C of those components of the example articulating support arm shown in FIG. 29, with the platform front edge raised.
Figure 29:
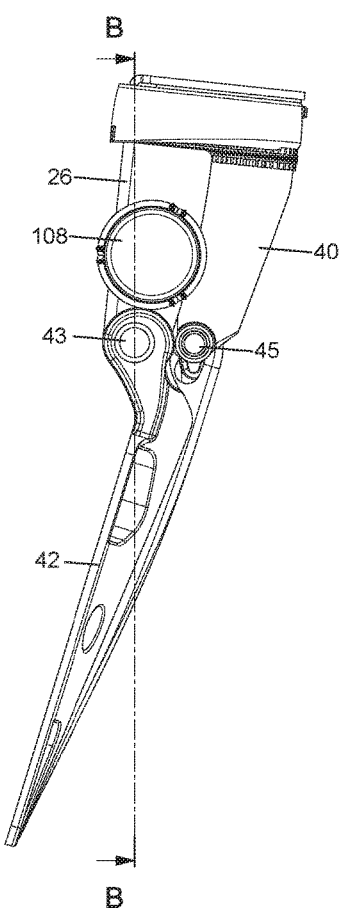
FIG. 29 is a side view of the control head, plunger, tilt mechanism and platform with a Section C-C through those components of the example articulating support arm shown with the platform front edge raised, as shown in FIG. 19.

Thus, the rearward facing brake elements 36, 36' are located on the plunger 40, and the plunger 40 is selectively movable toward and away from the forward facing brake elements 34, 34' on the distal ends of the second set of control arms 20, 20'. The brake elements 34, 34', 36, 36' may include circular structures having complementary serrated, interlocking faces, which may be provided in disks or rings that are connected to the components, or may be integrally formed with the components. When the front edge of the platform 42 is pivoted upward, as shown in FIG. 19, the platform 42 moves the rearward facing brake elements 36, 36' on the plunger 40 forward so as to release from locking engagement with the forward facing brake elements 34, 34' on the distal ends 24, 24' of the second set of control arms 20, 20', wherein the articulating support arm 10 is vertically movable. In contrast, when the front edge of the platform 42 is pivoted downward to a rest position relative to the control head 26, such as is shown in FIG. 18, the platform 42 moves the rearward facing brake elements 36, 36' on the plunger 40 rearward so as to lockingly engage the forward facing brake elements 34, 34' on the distal ends 24, 24' of the second set of control arms 20, 20'. This effectively locks the second set of control arms 20, 20' relative to pivotal movement, thereby locking both the first and second sets of control arms 14, 14', 20, 20' and thereby the support arm 10 in a vertical adjustment position of the control head 26 relative to the base 12. It will be appreciated that alternative structures may be used and that the vertical adjustable positions of the control head need not have defined discrete positions, but could have an unlimited number of positions between the uppermost and lowermost attainable positions. It also will be appreciated that the example brake elements 34, 34', 36, 36' of the preferred example may be constructed of various relatively rigid materials, such as plastic or metal, and may be connected to the plunger and arm structures by use of suitable fasteners, such as screws, press fit pins, rivets or the like, or may be integrally formed into such components.

The plunger 40 and platform 42 preferably are constructed of relatively rigid material, such as by being constructed of cast metal, sheet metal, fiber reinforced plastic, or the like. Each of the plunger 40 and platform 42 also may be formed in one piece with apertures and flanges as needed for mounting of pivot shafts, and it is contemplated that a keyboard support tray and/or mouse pad, or other more expansive work surface may be connected to the platform for supporting one or more data entry/input devices.

Figure 11:
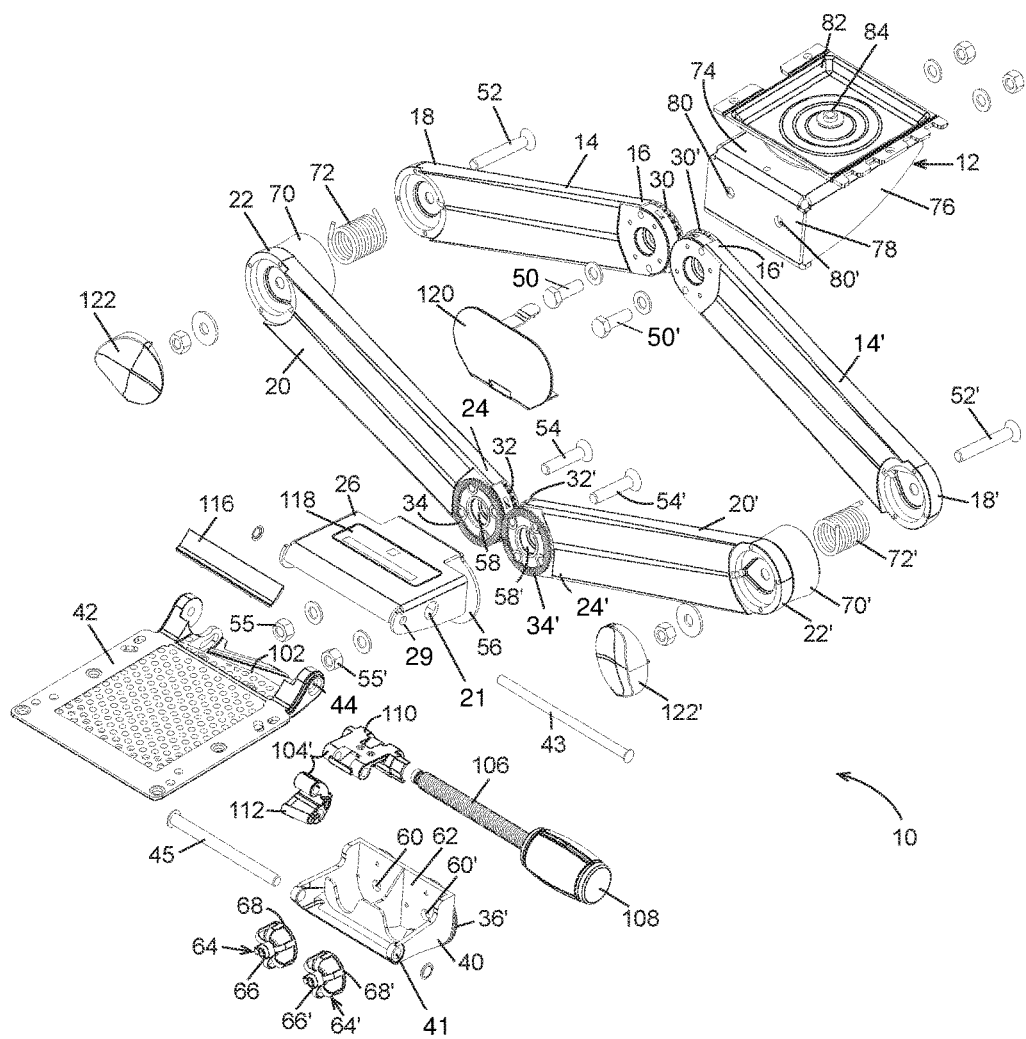
FIG. 11 is front upper perspective partially exploded view of the example articulating support arm shown in FIG. 1 in the lowered position.
Figure 12:
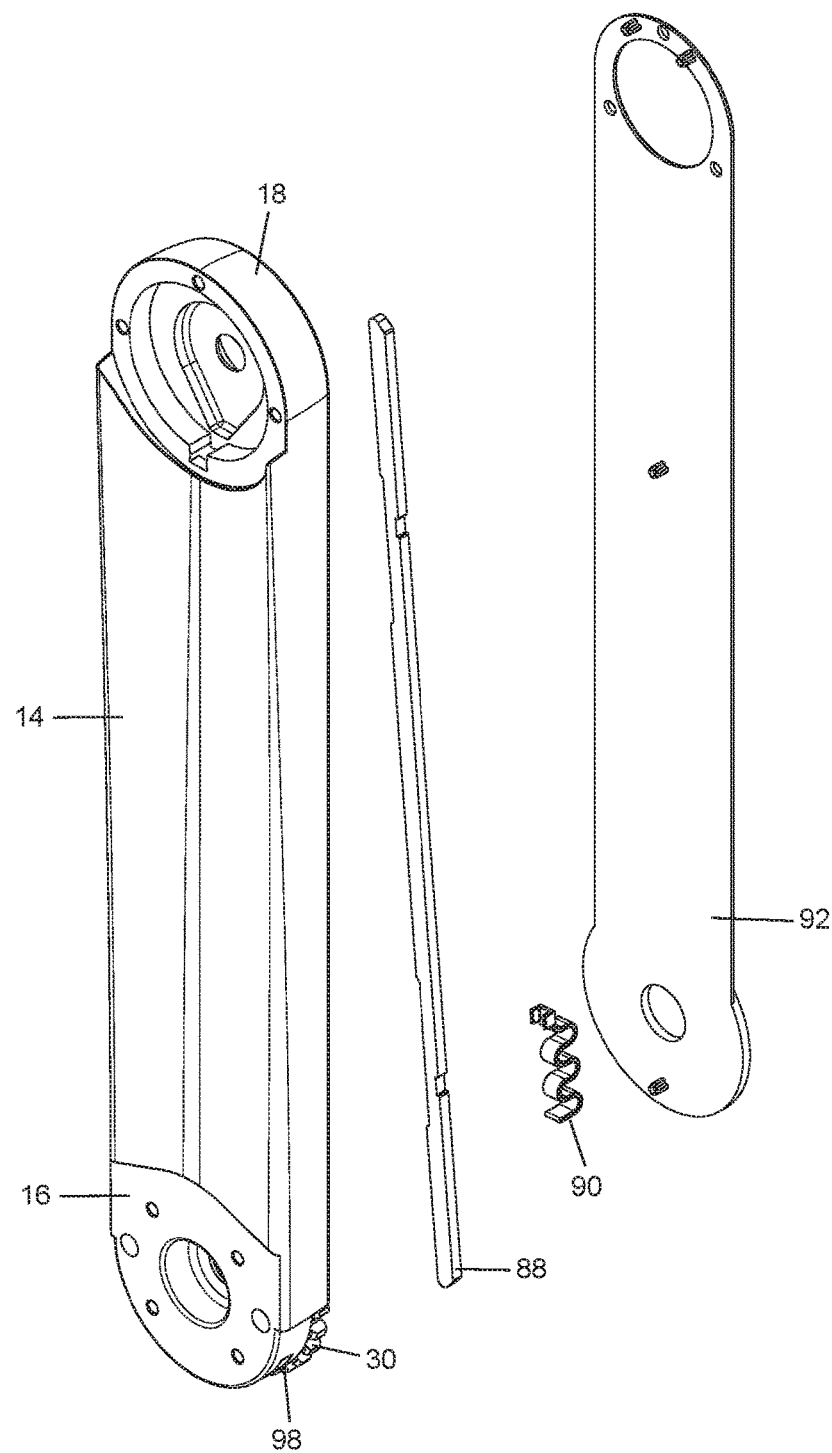
FIG. 12 is front perspective partially exploded view of one of the control arms of the first set of control arms of the example articulating support arm shown in FIG. 1.

In the preferred example embodiment shown in FIG. 11, the pivotal connection of the proximal ends 16, 16' of the first set of control arms 14, 14' to the base 12 is via pivot shafts 50, 50', in the form of fasteners that include bolts with nuts. The pivotal connection of the distal ends 18, 18' of the first set of control arms 14, 14' to the proximal ends 22, 22' of the second set of control arms 20, 20' is via pivot shafts 52, 52', in the form of fasteners that include bolts with nuts. The pivotal connection of the distal ends 24, 24' of the second set of control arms 20, 20' to the control head 26 is via pivot shafts 54, 54', in the form of fasteners that include bolts with nuts. In the pivotal connection to the control head 26, the distal ends 24, 24' of the second control arms 20, 20' are positioned in front of a rear wall 56 of the control head 26, and the control arms 20, 20' extend outward from the control head 26. First fasteners 55, 55' are connected to the pivot shafts 54, 54' and retained within the distal ends 24, 24' of the second set of control arms 20, 20'. In this example, the first fasteners 55, 55' include nuts on the pivot shafts 54, 54' that are received in recesses 58, 58' in the front face of the distal ends 24, 24' of the second set of control arms 20, 20', ensuring that the second set of control arms 20, 20' stay pivotally connected to the rear wall 56 of the control head 26, while maintaining smooth pivotal movement.

Figure 16:
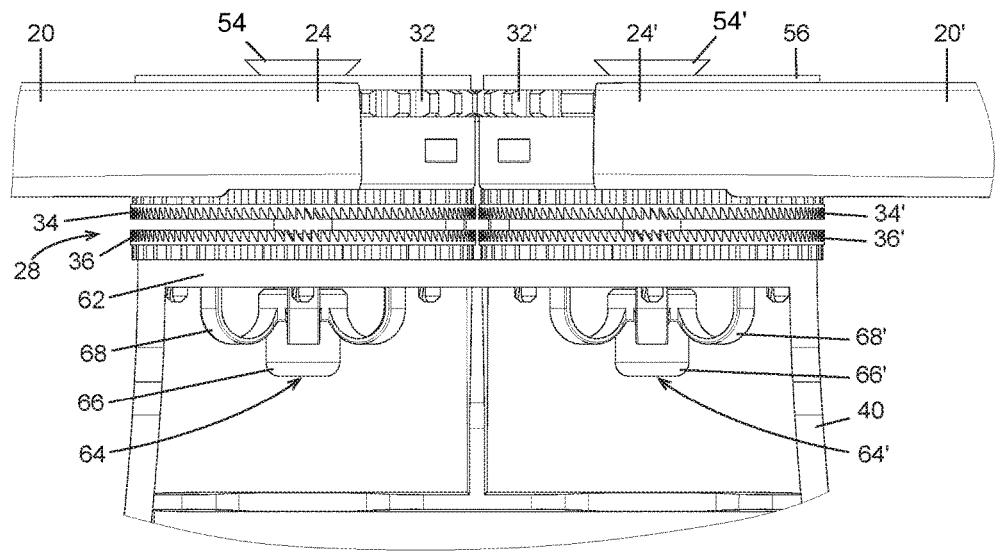
FIG. 16 is a top view of the example articulating support arm shown in FIG. 1 in the area of the control head, but with the control head removed and the plunger in a position wherein the brake elements are released from locking engagement.
Figure 17:
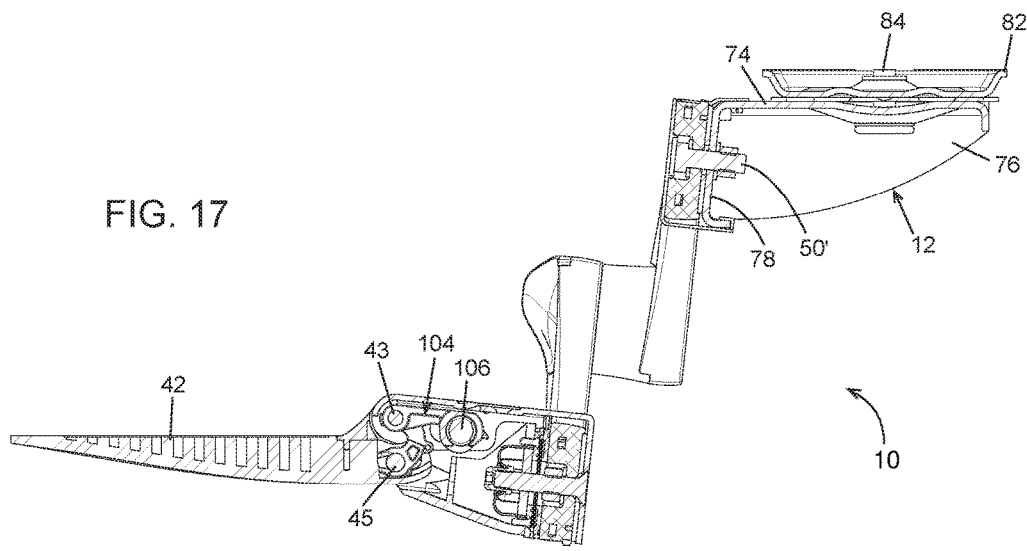
FIG. 17 is a side cross-section view through the base, control head and platform of the example articulating support arm shown in FIG. 8 in the lowered position.

As best seen in FIGS. 16, 18 and 19, the pivot shafts 54, 54' also extend further forward and through respective apertures 60, 60' in a rear wall 62 of the plunger 40. Thus, the distal ends 24, 24' of the second set of control arms 20, 20' being pivotally connected to the control head 26 includes respective pivot shafts 54, 54' that extend through the rear wall 56 of the control head 26, the distal ends 24, 24' of the second set of control arms 20, 20', and the plunger 40. The ends of the pivot shafts 54, 54' are captured by resilient fasteners 64, 64', which include respective central nuts 66, 66' and resilient elements 68, 68', in the form of flexible basket structures extending from the central nuts 66, 66'. It will be appreciated that when the plunger 40 is selectively pivoted relative to the platform 42, the plunger 40 will slide on the pivot shafts 54, 54' at the apertures 60, 60'. However, the resilient fasteners 64, 64' that are connected to the pivot shafts 54, 54' bias the plunger 40 rearward, as the rear wall 62 of the plunger 40 is pushed rearward by the resilient elements 68, 68' toward the distal ends 24, 24' of the second set of control arms 20, 20'. This rearward biasing of the plunger 40 tends to ensure that the brake elements 36, 36' will stay engaged with the brake elements 34, 34', despite the support arm 10 experiencing vibration or an inadvertent light bumping by a the user. While each of the fasteners 64, 64' features an integrally formed nut and resilient element, it will be appreciated that the nuts and resilient elements may be constructed in other configurations and whether being of combined or separate construction.

It will be appreciated from FIGS. 1-11 that the pivotal connections among the base 12, the first and second sets of control arms 14, 14' and 20, 20', and the control head 26 are provided by the generally parallel pivot shafts 50, 50', 52, 52', 54, 54', which collectively form a six bar linkage. While shown in the preferred example as bolts with nuts, it also will be appreciated that the pivot shafts for the pivotal connections between the various components may be constructed in other ways, whether they include separate pins, axles and/or other forms of fasteners, and whether they have heads, stops, nuts or other forms of ends, as well as whether or not they include some structures that are integrally formed with the other adjacent components, such as in the form of integral shafts, threaded apertures or other suitable means of providing at least portions of pivotal connections. It also will be appreciated that the control head 26 is movable to different vertical positions relative to the base 12 while the platform 42 advantageously maintains a substantially similar angular orientation relative to a horizontal plane.

The respective pivotal connections of these components of the support arm 10 include the distal ends 18, 18' of the first set of control arms 14, 14' being disposed forward of the proximal ends 22, 22' of the second set of control arms 20, 20'. This results in the six bar linkage having a quite shallow configuration in the front to rear direction, while still permitting the control head 26 to move past the base 12. This can be seen for instance in FIGS. 8-10, with the articulating ergonomic support arm 10 in fully lowered, neutral (the control head 26 is aligned with the base 12), and fully raised positions, respectively.

Figure 7:
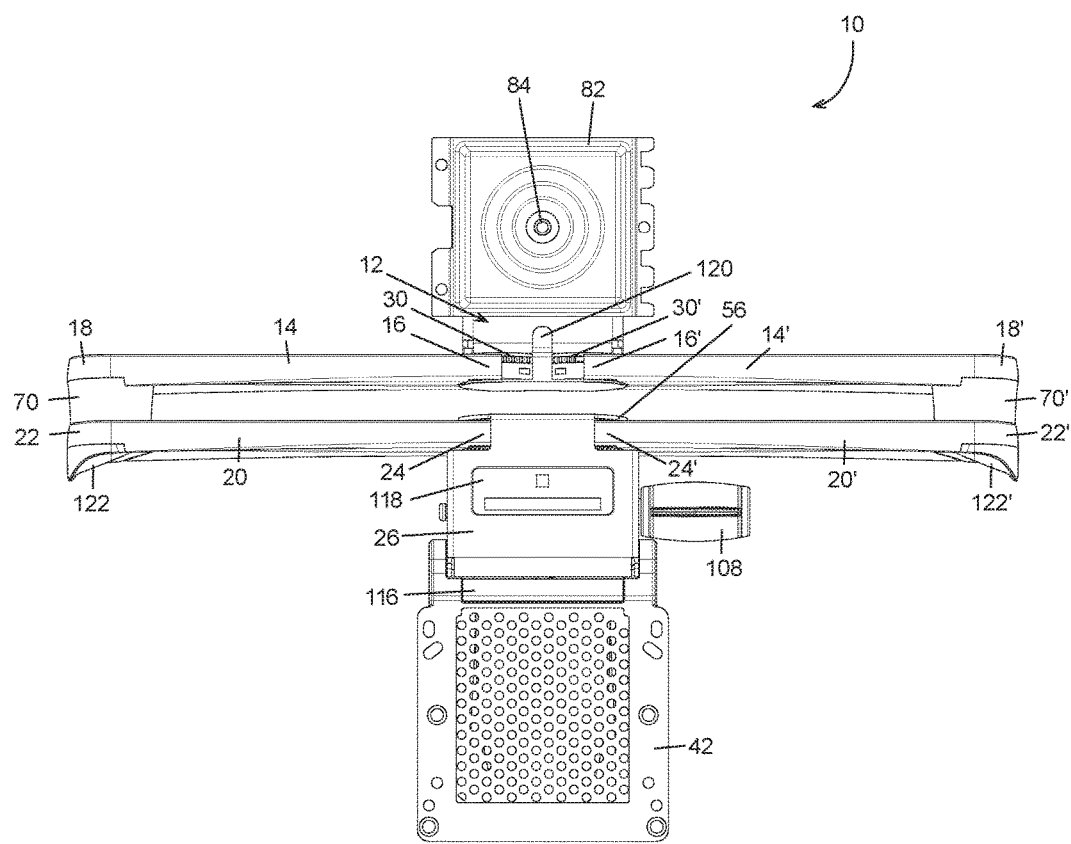
FIG. 7 is a top view of the example articulating support arm shown in FIG. 1 in the aligned or neutral position.
Figure 8:
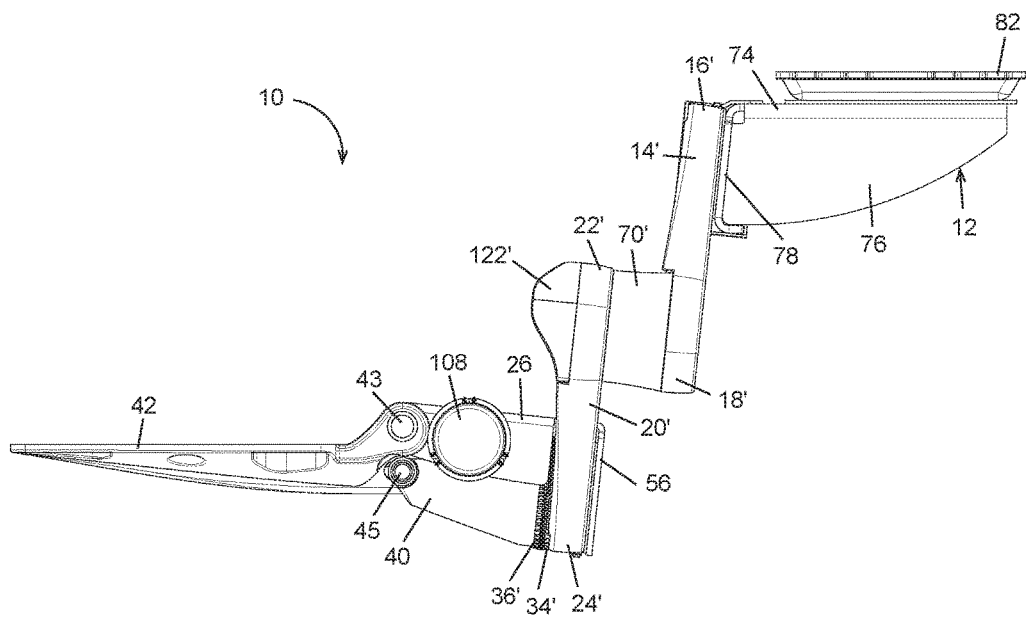
FIG. 8 is a side view of the example articulating support arm shown in FIG. 1 in the lowered position.
Figure 13:
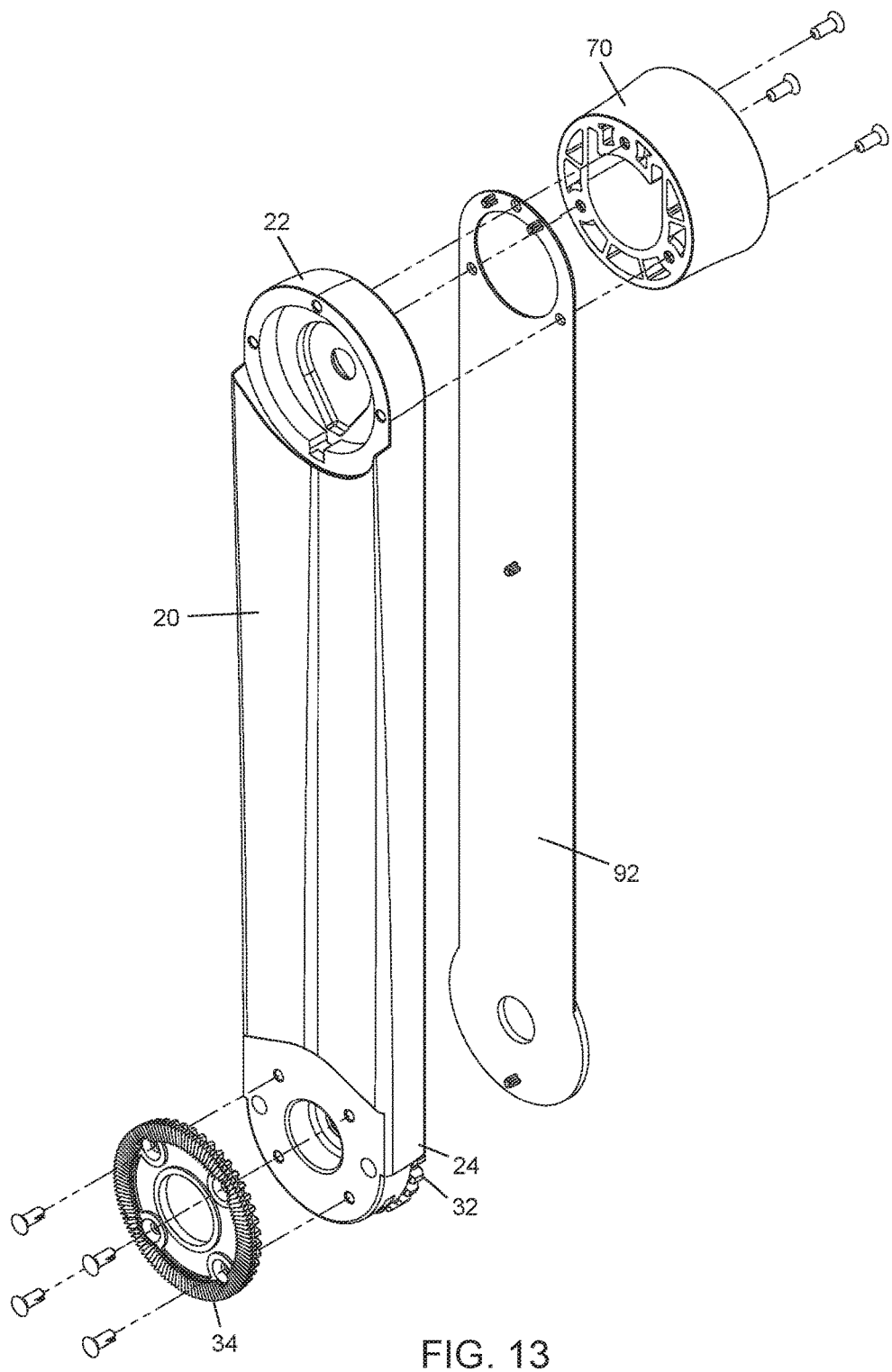
FIG. 13 is front perspective partially exploded view of one of the control arms of the second set of control arms of the example articulating support arm shown in FIG. 1.
Figure 14:
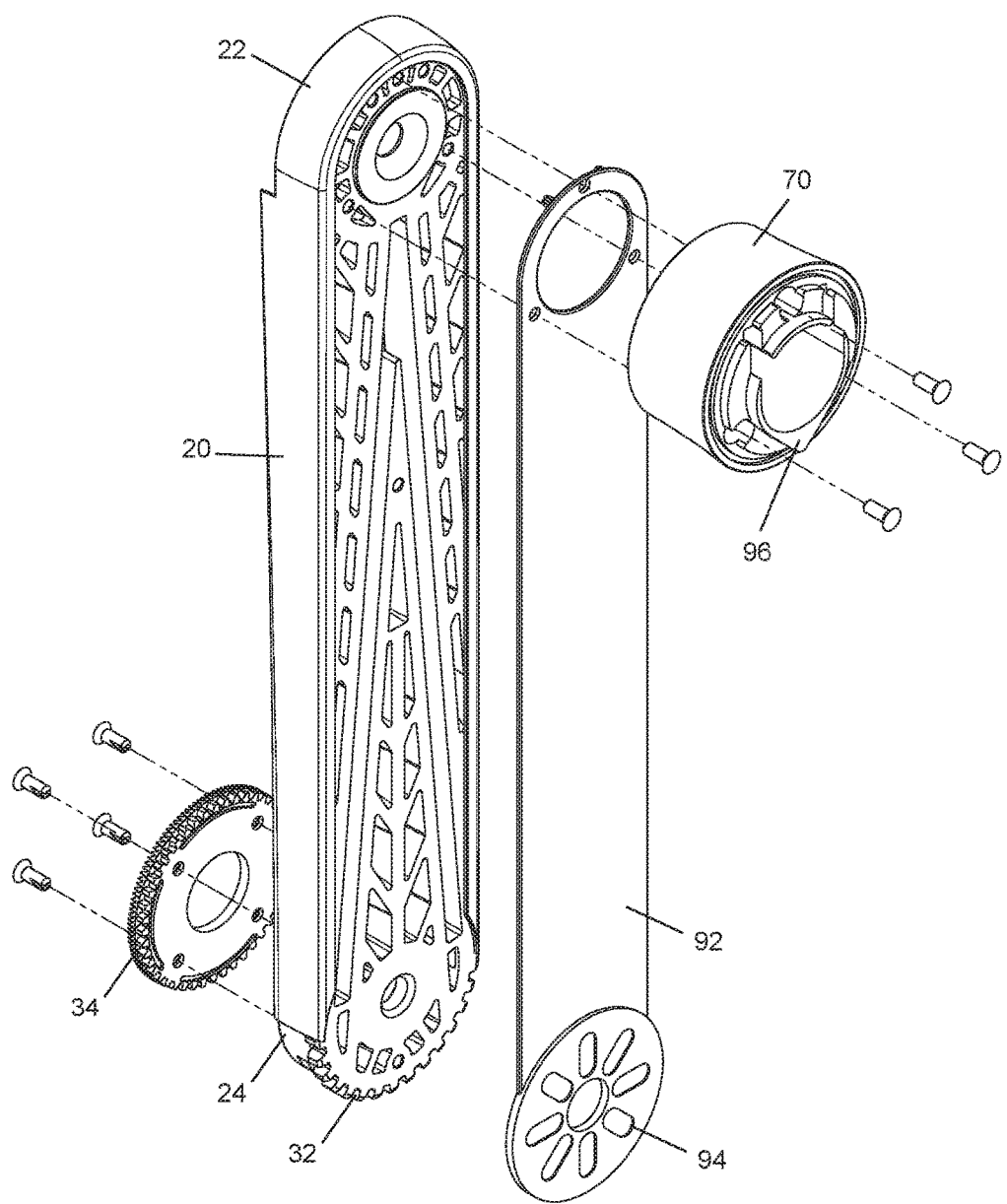
FIG. 14 is rear perspective partially exploded view of the control arm of the second set of control arms shown in FIG. 13.

As best seen in FIGS. 1, 7 and 11, the connections between the first and second sets of control arms also include hubs 70, 70', which are connected to the rear of the proximal ends 22, 22' of the second set of control arms 20, 20'. As best seen in FIGS. 13 and 14, the hubs 70, 70' may be connected to the second set of control arms 20, 20' by use of suitable fasteners, such as screws, press fit pins, rivets or the like. As best seen in FIG. 11, the hubs 70, 70' receive first resilient members 72, 72', which are disposed between and coupled to the first and second sets of control arms 14, 14', 20, 20', respectively, and tend to bias the first and second sets of control arms to move the control head 26 upward. In this example, the first resilient members 72, 72' are in the form of torsional coiled springs having end legs that are captured by recesses in the distal ends 18, 18' of the first set of control arms 14, 14' and recesses in the proximal ends 22, 22' of the second set of control arms 20, 20'. The first resilient members 72, 72' advantageously provide assistance in lifting and supporting the control head 26 and platform 42 relative to the base 12. Thus, the first resilient members 72, 72' tend to move the control head 26 upward toward the fully raised. This may be helpful to a user when moving and effectively lifting to a position for use or to be stowed, and may help avoid a sudden downward drop when the articulating ergonomic support arm 10 is unlocked to permit movement. It will be appreciated that other arrangements and constructions of one or more resilient members may be utilized to assist in supporting and upward movement of the control head 26 and platform 42 of the support arm 10, and that the components may permit adjustment of the lifting force provided by the first resilient members.

In this example, as best seen in FIGS. 1, 7, 8, 11 and 17, the base 12 of the articulating ergonomic support arm 10 is in the form of a clevis, which may be constructed of any suitable relatively rigid material, such as cast metal, sheet metal, molded plastics, or the like. Thus, the base 12 has a U-shape that includes a body 74 and downward extending side walls 76, with a downward extending front wall 78 having apertures 80, 80' for receipt of the pivot shafts 50, 50'. The body 74 of the base 12 may be connected to a mounting plate 82, for connection to a workstation directly or via a sliding track. In the preferred example, the mounting plate 82 is pivotally connected to the base 12 at a pivot shaft 84, wherein the mounting plate 82 serves as a swivel plate.

It will be appreciated that the base 12 is configured to be coupled to a workstation, which may be in various forms, such as a table, desk, shelf, credenza or the like. With respect to coupling to a workstation, if it is desired that the base 12 not be movable, then the body 74 of the base 12 may be directly mounted to a workstation, such as be the use of screws or other suitable fasteners. Alternatively, the base 12 could include a mounting plate 82, which could be mounted to the workstation directly, or via a track that permits forward and rearward movement of the support arm 10. In still a further alternative, the mounting plate 82 may be a swivel plate that permits the support arm 10 to swivel in place, or to further be mounted via a track that additionally permits fore and aft movement and swiveling of the support arm 10.

It will be appreciated from FIGS. 11, 16, 18 and 19 that the locking assembly 28 of the articulating support arm 10 may be easily and conveniently unlocked. As seen in FIG. 19, when a forward edge of the platform 42 is tilted upward, pivoting about the pivot shaft 43, the plunger 40 that is pivotally connected to the platform 42 at the further pivot shaft 45 is moved forward relative to the control head 26, and therefore, pulls the brake elements 36, 36' forward. This unlocks the pivotal connection of the second control arms 20, 20', and consequently both the first and second sets of control arms 14, 14', 20, 20' are free to pivot, and the support arm 10 may then be moved to a selected position with the control head 26 at or between a fully raised position and a fully lowered position. Accordingly, as seen FIG. 18, when the front edge of the platform 42 is released and gravity or other objects on the platform 42 tend to tilt the front edge of the platform 42 downward to a rest position, the plunger 40 pushes the brake elements 36, 36' rearward and into engagement with the brake elements 34, 34' on the opposed surfaces of the distal ends 24, 24' of the second set of control arms 20, 20', locking the brake elements 34, 34', 36, 36' rotationally.

As can be appreciated from FIGS. 12-14 and 21-24, each control arm of the first set of control arms 14, 14' includes an internal channel 86, 86' that slidably receives a positioning rod 88, 88'. The internal channels 86, 86' further receive second resilient members 90, 90' that are connected to and bias the positioning rods 88, 88' toward the distal ends 18, 18' of the first set of control arms 14, 14'. The second resilient members 90, 90' are clipped to the positioning rods 88, 88', and the positioning rods 88, 88' and second resilient members 90, 90' of this example are held within the first set of control arms 14, 14' by control arm covers 92, 92'. It will be appreciate that for cost effectiveness, while the first set of control arms 14, 14' receive positioning rods 88, 88', all of the first and second control arms 14, 14', 20, 20' advantageously may have similarly formed arm structures that are closed by covers 92, 92'. Therefore, a universal structure may be used for the basic configuration of the control arms, and the covers may share the same structure, as well. The covers 92, 92' also may include recesses 94, 94' to conveniently accommodate grease or debris, to help ensure smooth pivotal operation. As further described herein, the positioning rods 88, 88' received within the first set of control arms 14, 14' are used to combat an inherent problem that would otherwise occur with a six bar linkage of this type, having four control arms that are intended to maintain a diamond pattern. The covers 92, 92' may be constructed of any of a variety of materials that preferably are relatively rigid, such as plastic or sheet metal, and may be connected to the arm structures by use of suitable fasteners, such as screws, press fit pins, rivets or the like.

Figure 2:
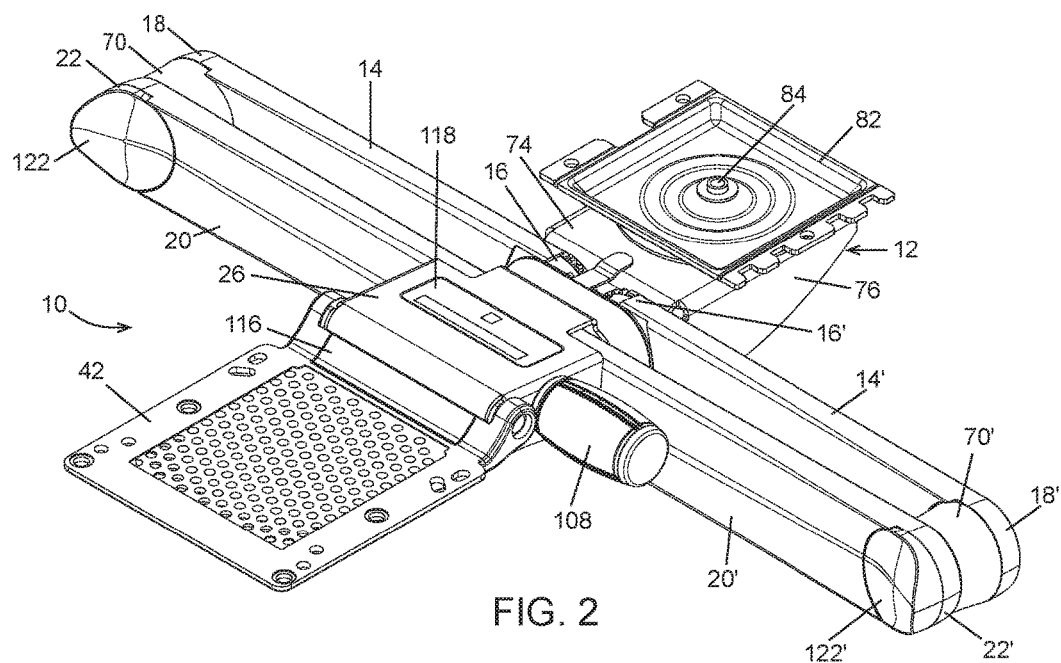
FIG. 2 is a front upper perspective view of the example articulating support arm shown in FIG. 1, in an aligned or neutral position.
Figure 3:
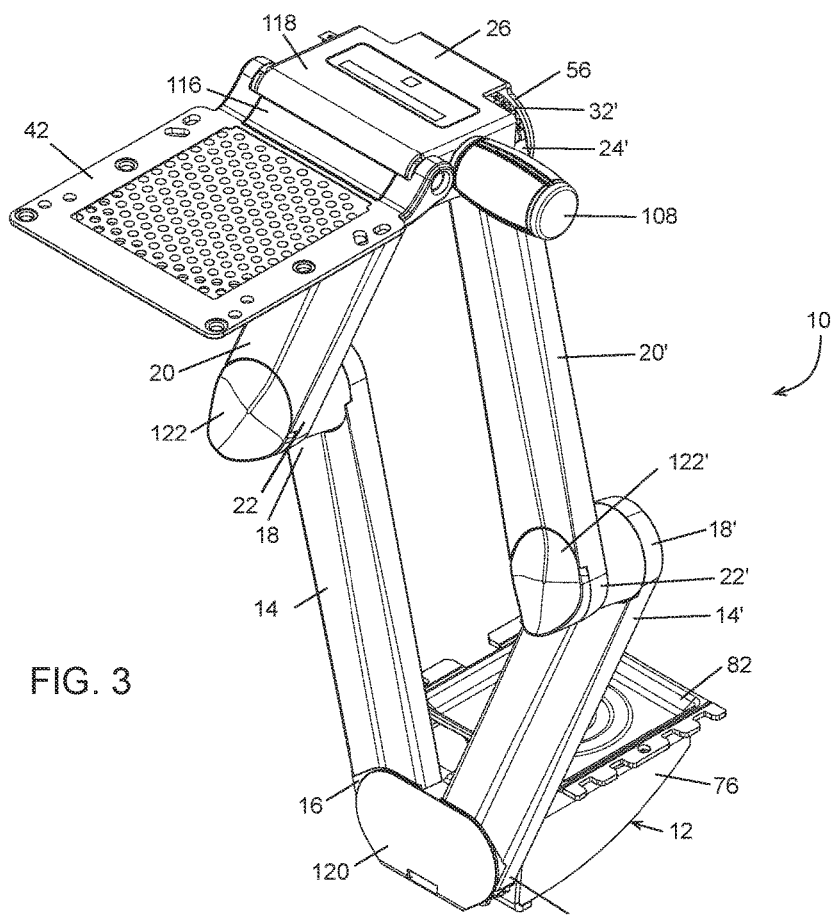
FIG. 3 is a front upper perspective view of the example articulating support arm shown in FIG. 1, in a raised position.
Figure 4:
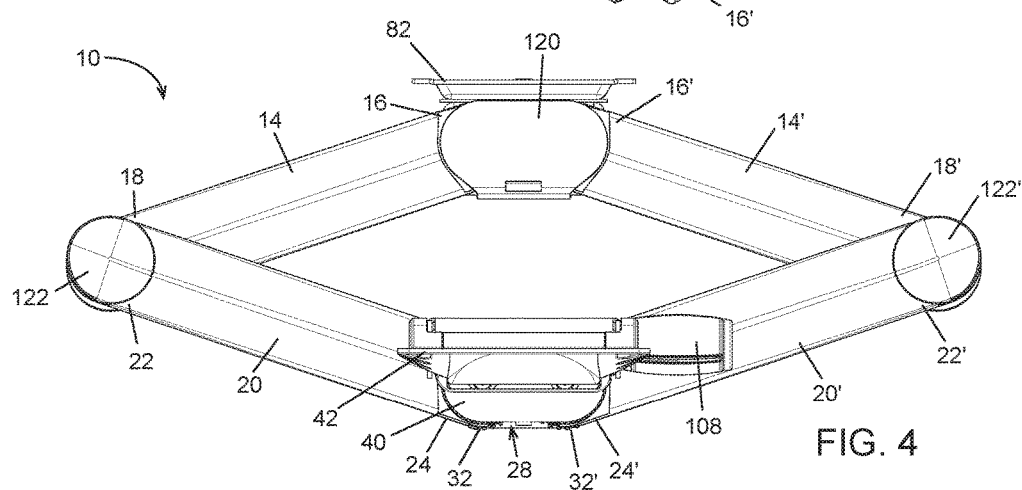
FIG. 4 is a front view of the example articulating support arm shown in FIG. 1 in the lowered position.
Figure 5:
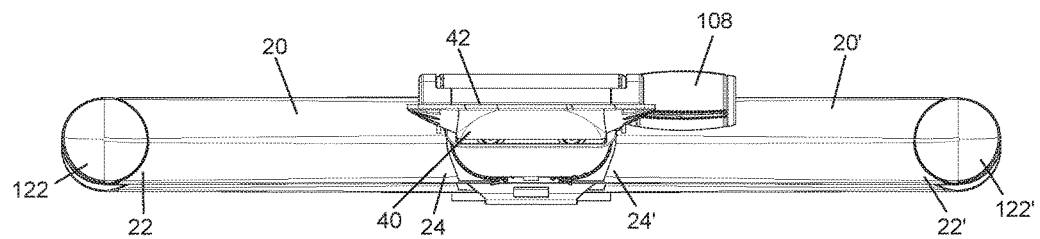
FIG. 5 is a front view of the example articulating support arm shown in FIG. 1 in the aligned or neutral position.
Figure 6:
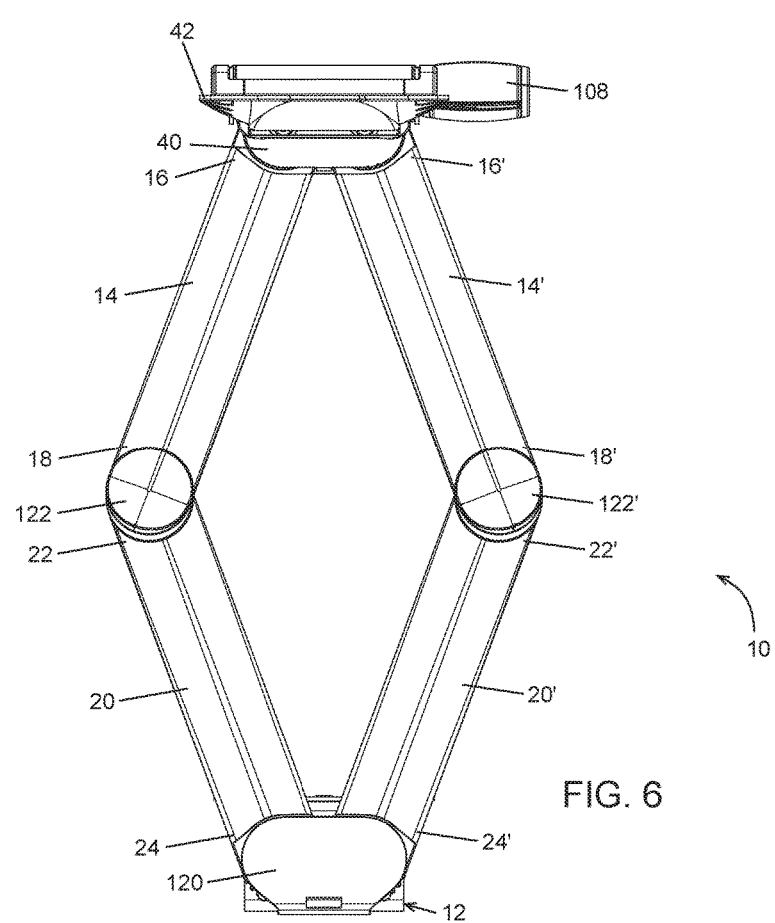
FIG. 6 is a front view of the example articulating support arm shown in FIG. 1 in the raised position.
Figure 9:
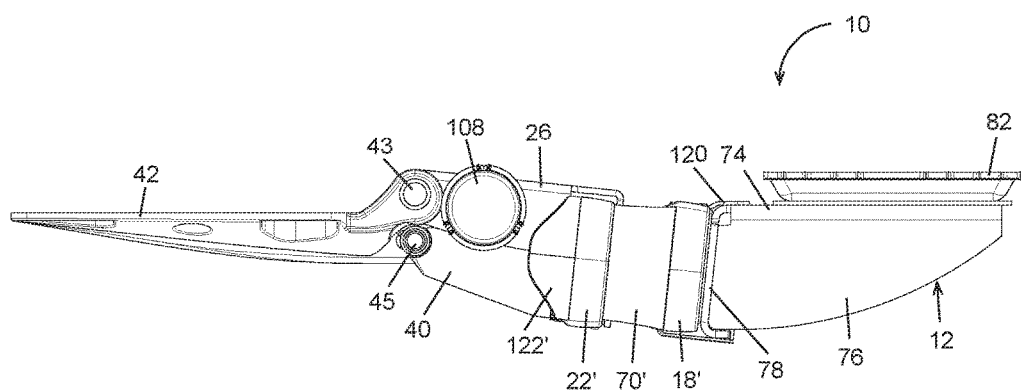
FIG. 9 is a side view of the example articulating support arm shown in FIG. 1 in the aligned or neutral position.
Figure 10:
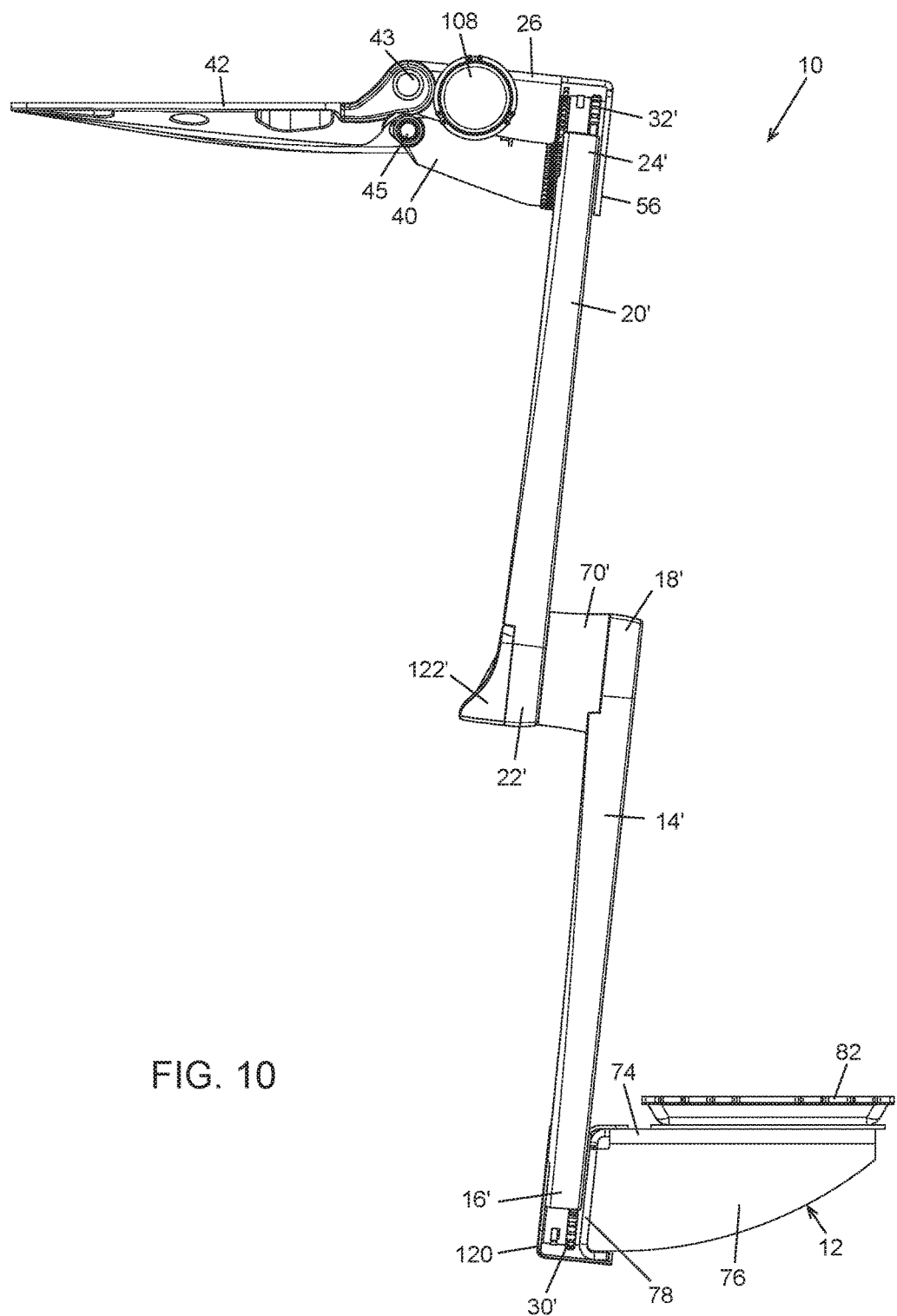
FIG. 10 is a side view of the example articulating support arm shown in FIG. 1 in the raised position.

It will be appreciated that during vertical adjustment of the control head 26 relative to the base 12, the tendency of the first and second sets of control arms 14, 14', 20, 20' is to become collinear when the control head 26 is aligned with base 12, as seen in FIGS. 2, 5 and 9. However, if under no other influence, the distal ends 18, 18' of the first set of control arms 14, 14' and the proximal ends 22, 22' of the second set of control arms 20, 20' would have the option of moving down or up, thereby collapsing the diamond shape into a downward or upward facing U-shape. This would disrupt the diamond configuration and disable the stable vertical adjustment of the support arm 10. Therefore, the positioning rods 88, 88' are employed to counteract this tendency. For instance, the positioning rods 88, 88' are used to temporarily resist downward pivoting of the first set of control arms 14, 14' when the control head 26 is being lowered or raised and is passing through a position wherein the control head 26 is in the neutral position wherein it is aligned with the base 12. This is accomplished by coordination with cams 96, 96' within the hubs 70, 70'.

As noted above and seen via FIGS. 1, 7, 11, 13 and 14, the hubs 70, 70' are connected to the proximal ends 22, 22' of the second set of control arms 20, 20', wherein the hubs 70, 70' are disposed between the distal ends 18, 18' of the first set of control arms 14, 14' and the proximal ends 22, 22' of the second set of control arms 20, 20'. As better seen in FIGS. 14 and 21-23, each hub 70, 70' also includes a cam 96, 96' that engages one of the respective positioning rods 88, 88' that extends from a slot 98, 98' that is in communication with the internal channel 86, 86' in the respective first set of control arms 14, 14'. The cams 96, 96' include a configuration that pushes the positioning rods 88, 88' toward the base 12, and thereby toward each other, when the first set of control arms 14, 14' are moving toward or away from the neutral positions wherein the control head 26 is aligned with the base 12. When the first set of control arms 14, 14' reaches the neutral or aligned position, the proximal ends of the positioning rods 88, 88' engage with each other and they temporarily lend their support to the first set of control arms 14, 14', so as to allow the control head 26 to pass by the base 12 and to allow the support arm 10 to have the first and second sets of control arms 14, 14', 20, 20' re-establish the diamond configuration. In this manner, the support arm 10 is able to ensure a stable transition as the height of the control head 26 and platform 42 are adjusted relative to the base 12.

While the articulating ergonomic support arm may be constructed with a preset orientation of the platform 42 relative to a horizontal plane, with such preset orientation being maintained throughout the height adjustment of the support arm, the example support arm 10 shown also provides for adjustment of the angular orientation of the platform 42 relative to a horizontal plane. Thus, as best seen in FIGS. 1, 11, 18-19 and 25-29, the support arm 10 may include a tilt adjustment assembly 100 by which the platform 42 is selectively tiltable relative to the control head 26. As shown, the platform 42 includes an angled abutment 102 that engages a slider 104 extending between the angled abutment 102 and a shaft 106 that is rotatably connected at apertures 21 to the control head 26. The shaft 106 and the slider 104 have corresponding screw threads thereon and the slider 104 is rotatably connected to the control head 26, with the slider 104 being rotatably connected to and driven by the shaft 106. In this example, the shaft 106 and slider 104 having corresponding screw threads thereon, and the slider being rotatably connected to the shaft 106, causes the slider to move linearly along the shaft 106 when the shaft 106 is rotated relative to the slider 104. The shaft 106 has a knob 108 fixedly connected to one end to permit a user to quickly and easily rotate the shaft 106 to perform a tilt adjustment, thereby changing the pitch or angle of inclination of the platform 42.

While the slider 104 may be constructed of a single piece, in the example shown, as may be seen in FIG. 11, the slider 104 has an upper portion 110 that engages the shaft 106 and a lower portion 112 that engages the angled abutment 102 on the platform 42. Thus, the lower portion 112 of the slider 104 and the angled abutment 102 have complementary angled surfaces that slidably engage each other and cause the platform 42 to tilt as the slider 104 moves along the shaft 106 and the complementary angled surfaces of the lower portion 112 and the angled abutment 102 cause displacement of the platform 42 relative to the shaft 106. In this configuration, the platform 42 is pivotally connected to the control head 26 by the pin 43 that is parallel to the shaft 106. Further, the slider upper portion 110 engages the shaft 106, and to keep from rotating with the shaft 106 the slider upper portion 110 also slidably engages the pin 43, while the slider lower portion 112 also slidably engages the pin 43. In the configuration shown, the slider upper portion 110 includes a U-shape which straddles and engages the slider lower portion 112 at their slidable connection to the pin 43. When the knob 108 is turned, the slider lower portion 112 is pushed toward one side or the other by the slider upper portion 110. FIGS. 26-29 are particularly useful in showing the relative positioning of the slider 104 on the angled abutment 102 and the resulting range of tilt adjustment when the knob 108 and shaft 106 are rotated from one extreme to the other. It will be appreciated that the slider 104 preferably is constructed of relatively rigid materials, such as cast metal, molded plastics, or the like.

During assembly, the slider 104 may be installed on the pin 43 that pivotally connects the control head 26 to the platform 42. Thus, the slider 104 need not be installed on the platform 42 but simply engages the angled abutment 102. In this example, the angled abutment 102 is integral with the platform 42. This can be very efficiently achieved during manufacture of the platform 42. Alternatively, a separate angled component could be connected to the rear of the platform 42 to be engaged by the slider 104. It will be appreciated that, in a further alternative, the angled abutment 102 could be configured so that the slider 104 is slidably connected to the angled abutment 102, such as within a channel, as opposed to simply slidably contacting a surface of the angled abutment 102.

Figure 15:
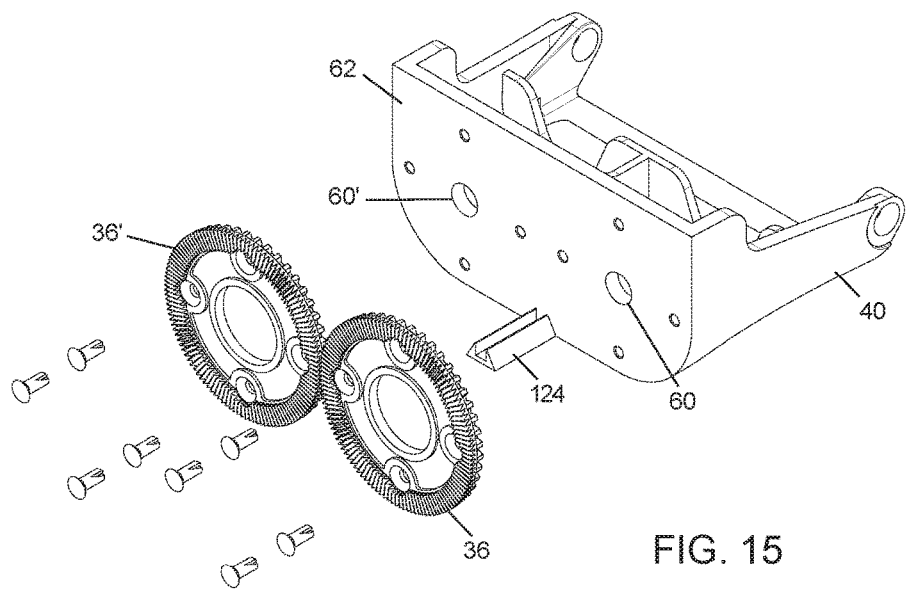
FIG. 15 is rear perspective partially exploded view of a plunger of the example articulating support arm shown in FIG. 1.

With the example shown and described above, the articulating ergonomic support arm 10 may be adjusted to position the platform 42 for use or stowage below a workstation, and the tilt adjustment or orientation of the platform 42 relative to a horizontal plane and to the control head 26 may be separately adjusted, if desired. The support arm 10 may include further components to enhance the appearance and safety of the device, such as a front shroud 116 to cover the tilt adjustment assembly 100 as seen in FIGS. 1 and 11, a shroud 118 that is integrally formed with the control head 26 to close the top of the control head 26 as seen in FIG. 1, a cover 120 that connects to the base 12 and covers the forward faces and potential pinch points of the proximal ends 16, 16' of the first set of control arms 14, 14' as seen in FIGS. 1 and 11, covers 122, 122' that close the front face of the proximal ends 22, 22' of the second set of control arms 20, 20' as seen in FIGS. 1 and 11, and a shroud 124 that closes the area between the distal ends 24, 24' of the second set of control arms 20, 20' at the plunger 40 as seen in FIG. 15. These components may be constructed of suitable materials, such as cast metal, sheet metal, molded plastics, or the like, and may be incorporated into adjacent components or separately connected to the assembly.

A second example embodiment of an articulating ergonomic support arm 210 is shown in several perspective, front, top and side views within FIGS. 30-36. The second example articulating ergonomic support arm 210 is quite similar to the first example 10 shown in FIGS. 1-29. Therefore, the second example is shown using the same reference numerals for components that are the same as were described with respect to the first example support arm 10, and the discussion of the structure and operation of such components in the second example support arm 210 that are in common with the first example support arm 10 will apply equally to the second example, and therefore, will not be repeated. Accordingly, unless otherwise stated, the structure and operation of the second example support arm 210 is the same as that of the first example support arm 10.

For example, the second example articulating ergonomic support arm 210 of FIGS. 30-36 includes a base 212. As with the first example, the support arm 210 also includes a first set of control arms 14, 14' having proximal ends 16, 16' and distal ends 18, 18', with the proximal ends 16, 16' of the first set of control arms 14, 14' being pivotally connected to the base 212. The support arm 210 further includes a second set of control arms 20, 20' having proximal ends 22, 22' and distal ends 24, 24', with the proximal ends 22, 22' of the second set of control arms 20, 20' being disposed forward of and pivotally connected to the distal ends 18, 18' of the first set of control arms 14, 14'. The distal ends 24, 24' of the second set of control arms 20, 20' are pivotally connected to a control head 226, and pliable pads 225 may be applied to cushion the engagement between the top surface of the arms 20, 20' and the control head 226 when moving, for instance, from the neutral position shown in FIG. 31 to the lowered position shown in FIG. 30. The support arm 210 also includes a locking assembly 228 that selectively prevents pivotal movement of the control arms 14, 14', 20, 20', so as to provide vertical adjustment of the control head 226 relative to the base 212.

The base 212 and control head 226 are constructed of rigid materials, such as sheet or die cast metal, or molded plastic. Each set of control arms must include at least two control arms. The control arms 14, 14', 20, 20' also are constructed of rigid materials, such as die cast metal or molded plastic, or as will be described further herein, a combination of materials. As with the first example, for advantageous cost and manufacturing considerations, the sets of control arms of the second example support arm 210 ideally share a common structural body and components, as were previously described with respect to the control arms in FIGS. 12-14 and 21-24. Consistent with the prior description, it will be appreciated that each of these components may be constructed in various ways, whether as multiple components connected together or as an integral component.

Figure 30:
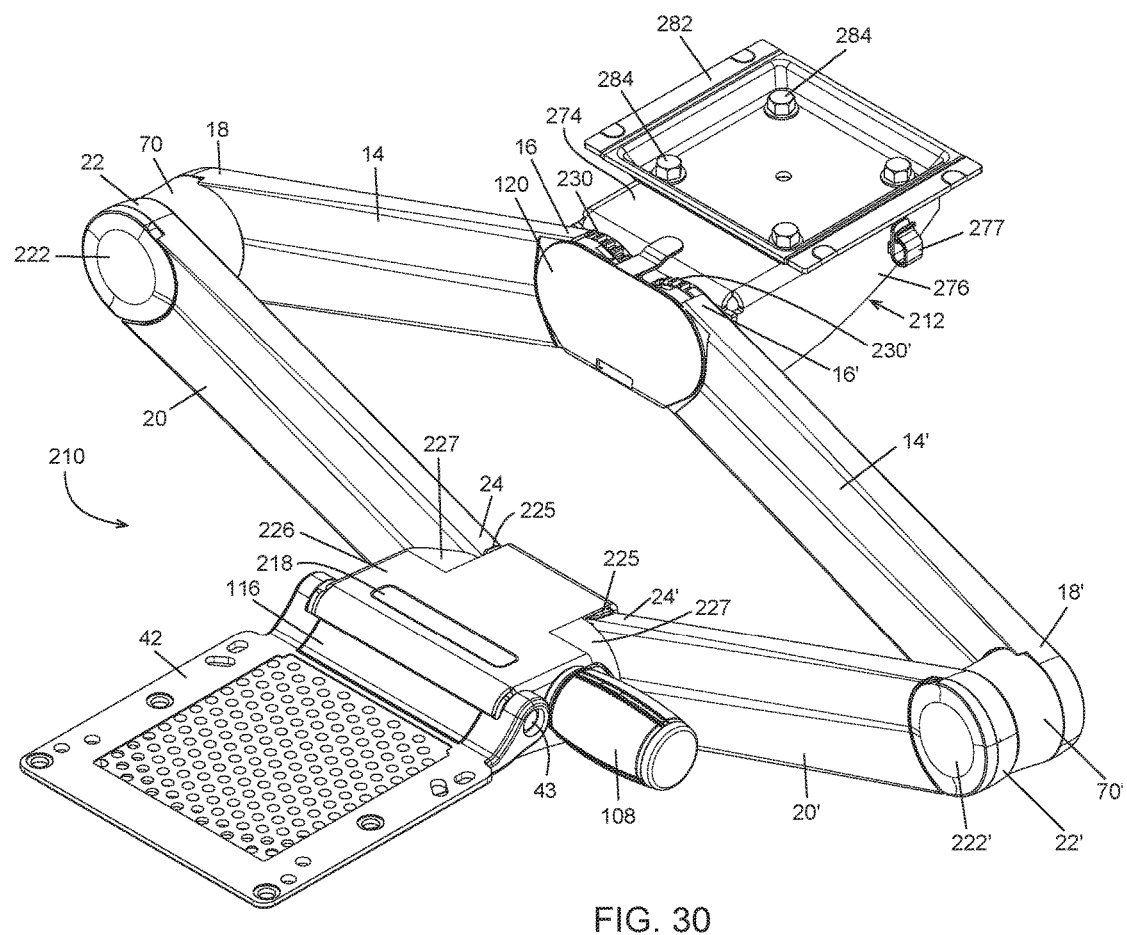
FIG. 30 is front upper perspective view of a second example embodiment of an articulating support arm in a lowered position.
Figure 31:
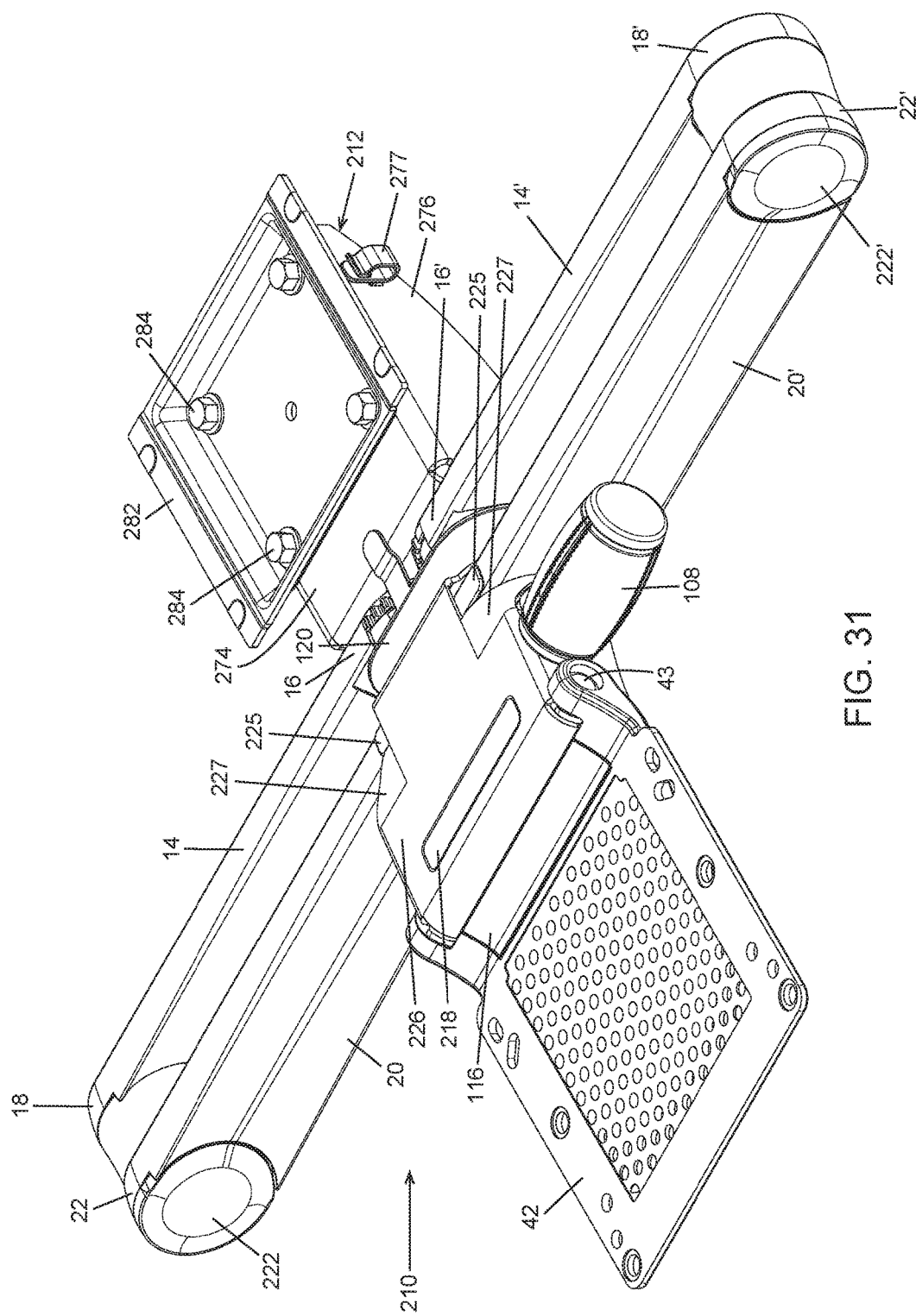
FIG. 31 is a front upper perspective view of the example articulating support arm shown in FIG. 30, in an aligned or neutral position.
Figure 32:
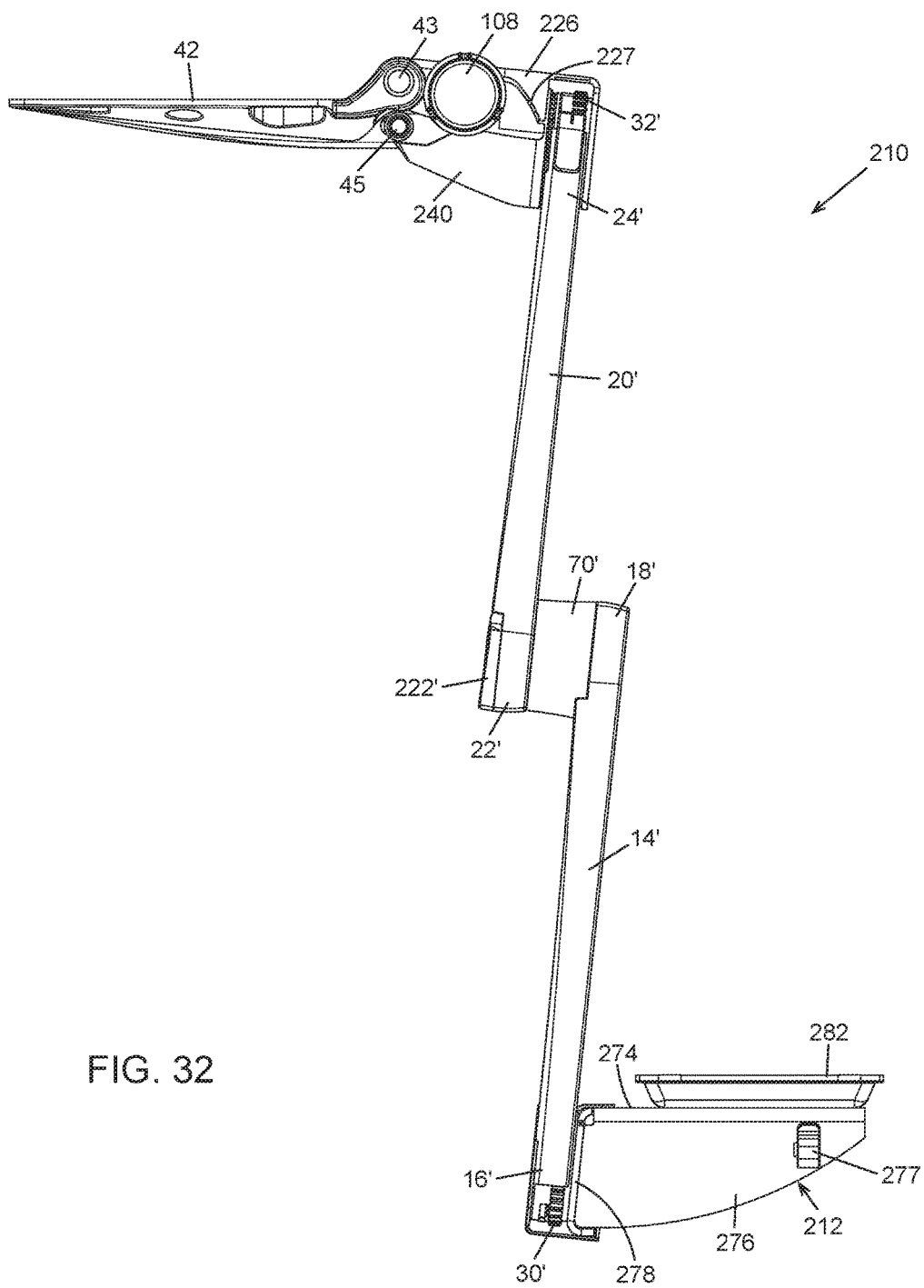
FIG. 32 is a side view of the example articulating support arm shown in FIG. 30, in a raised position.
Figure 33:
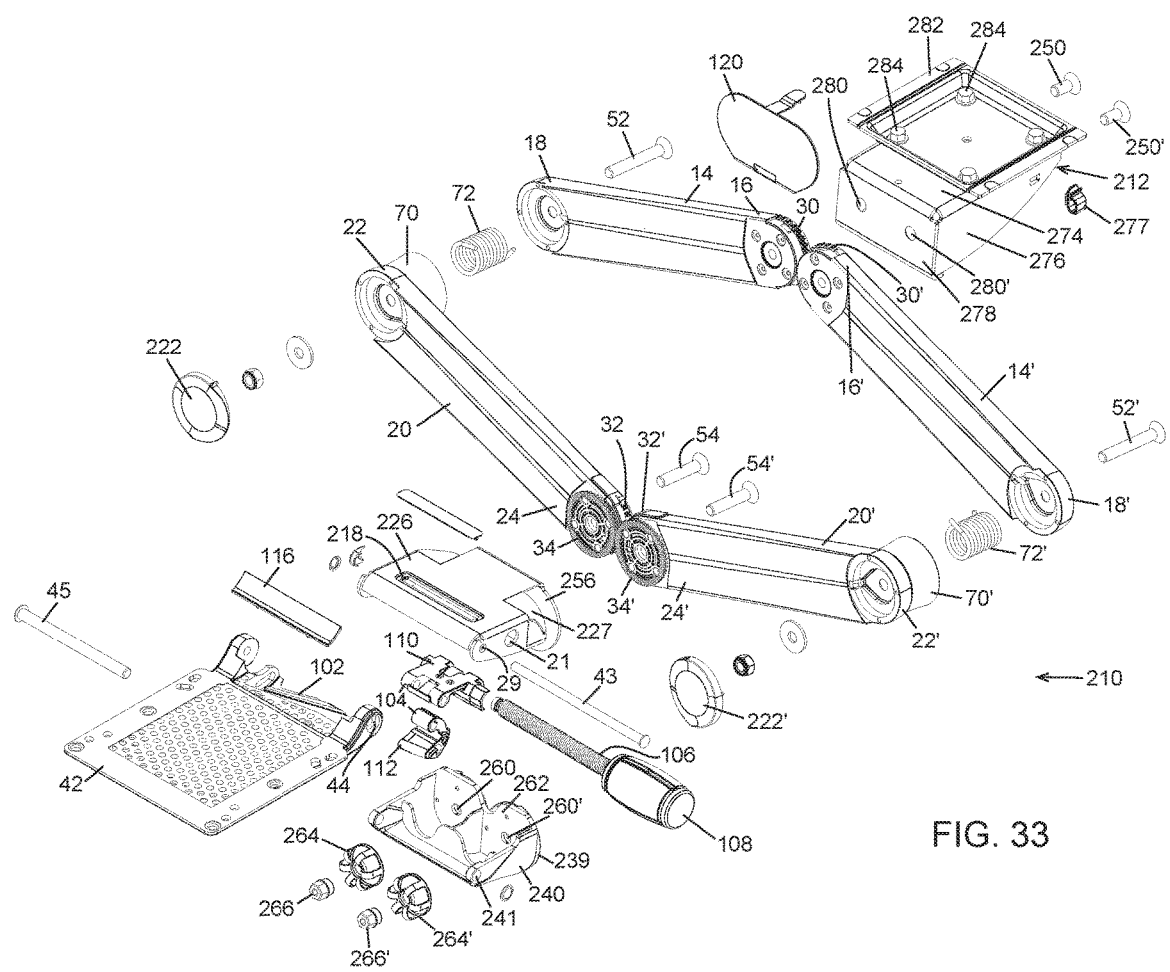
FIG. 33 is a front upper perspective partially exploded view of the example articulating support arm shown in FIG. 30 in the lowered position.

As best seen in FIGS. 30, 31 and 33, the proximal ends 16, 16' of the first set of control arms 14, 14' further include radially positioned teeth 30, 30', with an intermeshing of the teeth 30, 30' of the respective proximal ends 16, 16' of the first set of control arms 14, 14'. With the proximal ends 16, 16' of the first set of control arms 14, 14' being pivotally connected to the base 212, the intermeshing of the teeth 30, 30' keeps the first set of control arms 14, 14' in registry with each other, helping to control the symmetry and plane during movement of the first set of control arms 14, 14'. In addition, as best seen in FIG. 33, the distal ends 24, 24' of the second set of control arms 20, 20' include radially positioned teeth 32, 32', with an intermeshing of the teeth 32, 32' of the respective distal ends 24, 24' of the second set of control arms 20, 20'. With the distal ends 24, 24' of the second set of control arms 20, 20' of the second support arm 210 being pivotally connected to the control head 226, the intermeshing of the teeth 32, 32' keeps the second set of control arms 20, 20' in registry with each other, similarly helping to control the symmetry and plane during movement of the second set of control arms 20, 20'. Depending on the position of the control head 226 relative to the base 212, the control arms 14, 14', 20, 20' together generally form a diamond shape. However, it will be appreciated that the vertical adjustment of the control head 226 relative to the base 212 of the support arm 210 includes the control head 226 being in at least respective positions disposed above, below and aligned with the base 212.

The radially positioned teeth 30, 30' on the proximal ends 16, 16' of the first set of control arms 14, 14' include at least a sector of radially positioned teeth. Additionally, the radially positioned teeth 32, 32' on the distal ends 24, 24' of the second set of control arms 20, 20' include at least a sector of radially positioned teeth. As with the first example, the respective radially positioned teeth of the support arm 210 may be integrally formed teeth on the respective ends of the control arms, as shown, or alternatively may be constructed as separate rings of teeth, or portions of rings of teeth, that may be connected to the appropriate respective ends of the control arms.

Figure 34A:
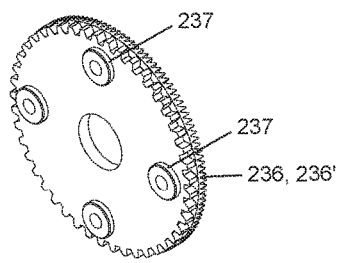
FIG. 34A is front perspective view of one of the brake elements of the example articulating support arm shown in FIG. 34.

As will be appreciated from FIGS. 13-16 and 35-36, the locking assembly 228 of the support arm 210 includes brake elements 34, 34' on the distal ends 24, 24' of the second set of control arms 20, 20', with the brake elements 34, 34' being forward facing. The brake elements 34, 34' also selectively engage brake elements 236, 236' that are coupled to the control head 226, with the brake elements 236, 236' being rearward facing and located on a plunger 240 that is coupled to the control head 226. In this second example, the brake elements 236, 236' are connected by fasteners to the plunger 240. As seen in FIG. 34A, the rear surface of a brake element 236, 236' has raised portions 237 that engage recesses 246 in the plunger 240. This engagement of the raised portions 237 with the recesses 246 effectively permits use of less robust fasteners to connect the brake elements 236, 236' to the plunger 240, because the fasteners are not subjected to shear. The plunder 240 also includes a peripheral shroud 239 that helps hide the teeth of brake elements 236, 236', prevent pinch points, and contain any grease that may be used. Curved shroud portions 227 on the control head 226 similarly help shield the teeth and prevent injury.

As in the first example, with the support arm 210, a platform 42 at apertures 44 is pivotally connected to the control head 226 at apertures 29 by a laterally extending pivot shaft 43, in the form of a pin. In turn, the plunger 240 at apertures 241 is pivotally connected to the platform 42 by a laterally extending pivot shaft 45, in the form of a pin. The pins may be held in place by use push nuts, retaining rings or other fasteners. It will be appreciated that the pivotal connections also could be provided by different constructions. In addition, the pivotal connection of the plunger 240 to the platform 42 is located at a position spaced from the pivotal connection of the platform 42 to the control head 226. In this way, the plunger 240 and its rearward facing brake elements 36, 36' are coupled to the control head 226.

Figure 35:
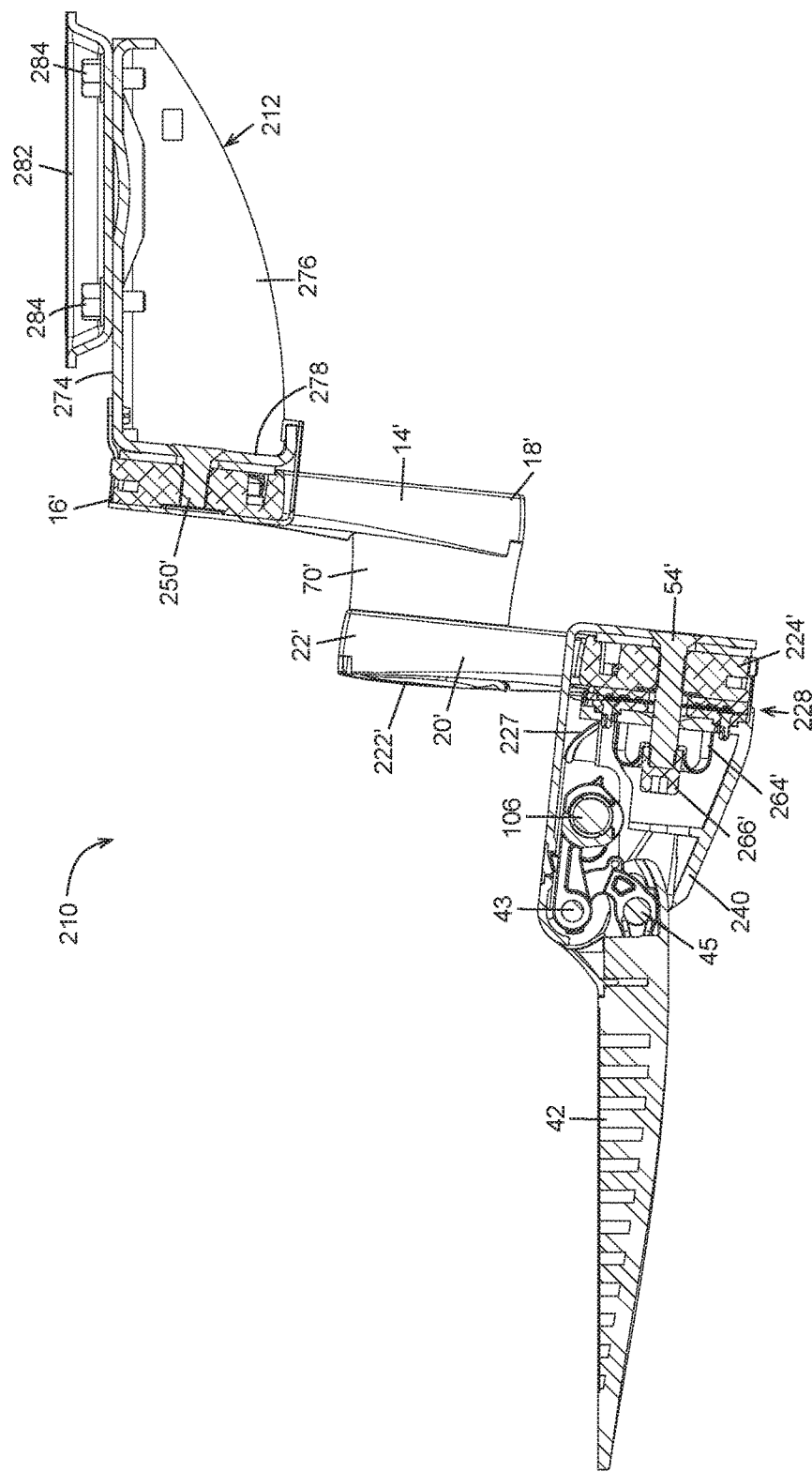
FIG. 35 is a side cross-section view through the base, control head and platform of the example articulating support arm shown in FIG. 30 in the lowered position.
Figure 36:
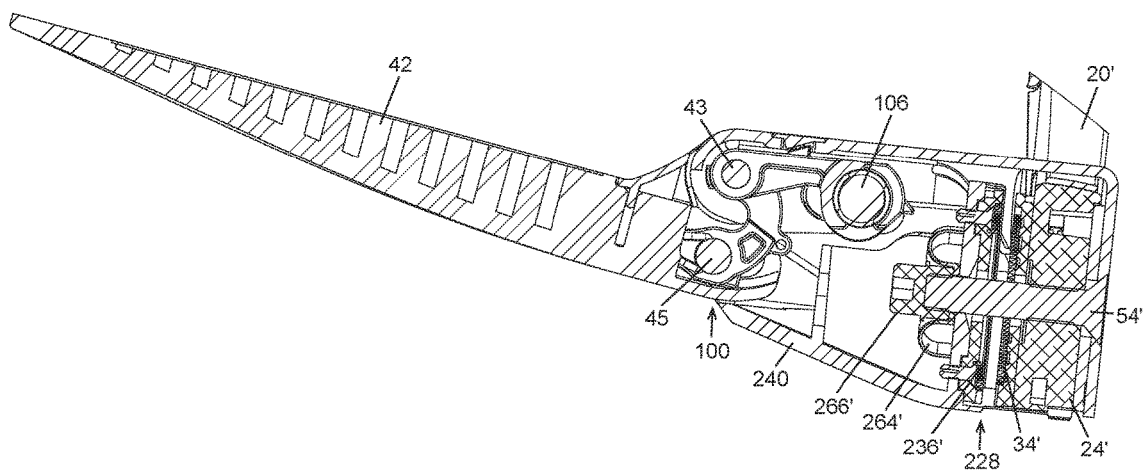
FIG. 36 shows the side cross-section view through the control head and platform of FIG. 35, but with the platform front edge raised, so as to pull the plunger forward and unlock the brake elements.

Thus, the rearward facing brake elements 236, 236' are located on the plunger 240, and the plunger 240 is selectively movable toward and away from the forward facing brake elements 34, 34' on the distal ends of the second set of control arms 20, 20'. The brake elements 34, 34', 236, 236' may include circular structures having complementary serrated, interlocking faces, which may be provided in disks or rings that are connected to the components, or may be integrally formed with the components. When the front edge of the platform 42 is pivoted upward, as shown in FIG. 36, the platform 42 moves the rearward facing brake elements 236, 236' on the plunger 240 forward so as to release from locking engagement with the forward facing brake elements 34, 34' on the distal ends 24, 24' of the second set of control arms 20, 20', wherein the articulating support arm 210 is vertically movable. In contrast, when the front edge of the platform 42 is pivoted downward to a rest position relative to the control head 226, such as is shown in FIG. 35, the platform 42 moves the rearward facing brake elements 236, 236' on the plunger 240 rearward so as to lockingly engage the forward facing brake elements 34, 34' on the distal ends 24, 24' of the second set of control arms 20, 20'. This effectively locks the second set of control arms 20, 20' relative to pivotal movement, thereby locking both the first and second sets of control arms 14, 14', 20, 20' and thereby the support arm 210 in a vertical adjustment position of the control head 226 relative to the base 212. It will be appreciated that alternative structures may be used and that the vertical adjustable positions of the control head need not have defined discrete positions, but could have an unlimited number of positions between the uppermost and lowermost attainable positions. It also will be appreciated that the example brake elements 34, 34', 236, 236' of this second preferred example may be constructed of various relatively rigid materials, such as plastic or metal, and may be connected to the plunger and arm structures by use of suitable fasteners, such as screws, press fit pins, rivets or the like, or may be integrally formed into such components.

As with the first example, the plunger 240 and platform 42 of the second example support arm 210 preferably are constructed of relatively rigid material, such as by being constructed of cast metal, sheet metal, fiber reinforced plastic, or the like. Each of the plunger 240 and platform 42 also may be formed in one piece with apertures and flanges as needed for mounting of pivot shafts, and it is contemplated that a keyboard support tray and/or mouse pad, or other more expansive work surface may be connected to the platform for supporting one or more data entry/input devices.

In the second preferred example embodiment shown in FIG. 33, the pivotal connection of the proximal ends 16, 16' of the first set of control arms 14, 14' to the base 212 is via pivot shafts 250, 250', in the form of fasteners that threadably engage the proximal ends 16, 16'. The pivotal connection of the distal ends 18, 18' of the first set of control arms 14, 14' to the proximal ends 22, 22' of the second set of control arms 20, 20' is via pivot shafts 52, 52', in the form of fasteners that include bolts with nuts. The pivotal connection of the distal ends 24, 24' of the second set of control arms 20, 20' to the control head 226 is via pivot shafts 54, 54', in the form of fasteners that threadably engage the distal ends 24, 24' and retain the distal ends 24, 24' relative to the control head 226. In the pivotal connection to the control head 226, the distal ends 24, 24' of the second control arms 20, 20' are positioned in front of a rear wall 256 of the control head 226, and the control arms 20, 20' extend outward from the control head 226.

As best seen in FIG. 36 the pivot shafts 54, 54' also extend further forward and through respective apertures 260, 260' in a rear wall 262 of the plunger 240. Thus, the distal ends 24, 24' of the second set of control arms 20, 20' being pivotally connected to the control head 226 includes respective pivot shafts 54, 54' that extend through the rear wall 256 of the control head 226, the distal ends 24, 24' of the second set of control arms 20, 20', and the plunger 240. The ends of the pivot shafts 54, 54' are fitted with resilient washers 264, 264' in the form of flexible basket structures, and captured by fasteners 266, 266' in the form of respective nuts. It will be appreciated that when the plunger 240 is selectively pivoted relative to the platform 42, the plunger 240 will slide on the pivot shafts 54, 54' at the apertures 260, 260'. However, the resilient washers 264, 264' that are connected to the pivot shafts 54, 54' bias the plunger 240 rearward, as the rear wall 262 of the plunger 240 is pushed rearward by the resilient washers 264, 264' toward the distal ends 24, 24' of the second set of control arms 20, 20'. This rearward biasing of the plunger 240 tends to ensure that the brake elements 236, 236' will stay engaged with the brake elements 34, 34', despite the support arm 210 experiencing vibration or an inadvertent light bumping by a the user. While each of the fasteners 266, 266' features a threaded nut that captures a resilient washer 264, 264', it will be appreciated that the nuts and resilient washers may be constructed in other configurations and whether being of combined or separate construction.

It will be appreciated from FIG. 33 that the pivotal connections among the base 212, the first and second sets of control arms 14, 14' and 20, 20', and the control head 226 are provided by the generally parallel pivot shafts 250, 250', 52, 52', 54, 54', which collectively form a six bar linkage. While shown in the second preferred example as bolts with threaded apertures in arms or nuts, it also will be appreciated that the pivot shafts for the pivotal connections between the various components may be constructed in other ways, whether they include separate pins, axles and/or other forms of fasteners, and whether they have heads, stops, nuts or other forms of ends, as well as whether or not they include some structures that are integrally formed with the other adjacent components, such as in the form of integral shafts, threaded apertures or other suitable means of providing at least portions of pivotal connections. It also will be appreciated that the control head 226 is movable to different vertical positions relative to the base 212 while the platform 42 advantageously maintains a substantially similar angular orientation relative to a horizontal plane.

As with the first example, the respective pivotal connections of these components of the support arm 210 include the distal ends 18, 18' of the first set of control arms 14, 14' being disposed forward of the proximal ends 22, 22' of the second set of control arms 20, 20'. This results in the six bar linkage having a quite shallow configuration in the front to rear direction, while still permitting the control head 226 to move past the base 212. This can be seen for instance in FIGS. 32 and 35, with the articulating ergonomic support arm 210 in fully raised and fully lowered positions, respectively.

As best seen in FIGS. 30 and 33, the connections between the first and second sets of control arms for the second example support arm 210 are similar to those of the first example support arm 10, and the description and advantages discussed above similarly apply.

In the second example, as best seen in FIG. 30, the base 212 of the articulating ergonomic support arm 210 is in the form of a clevis, which may be constructed of any suitable relatively rigid material, such as cast metal, sheet metal, molded plastics, or the like. Thus, the base 212 has a U-shape that includes a body 274 and downward extending side walls 276, with a downward extending front wall 278 having apertures 280, 280' for receipt of the pivot shafts 250, 250'. The body 274 of the base 212 may be connected to a mounting plate 282, for connection to a workstation directly or via a sliding track. In the second preferred example, the mounting plate 282 is fixedly connected to the base 212 by fasteners 284, which prevents swiveling at the base 212. A cable holder 277 may be provided connected to a side wall 276 to help control the routing of cables, such as a cable extending from a keyboard that may rest on a keyboard support that would be connected to the platform 42.

As discussed with the first example, it will be appreciated that the base 212 is configured to be coupled to a workstation, which may be in various forms, such as a table, desk, shelf, credenza or the like. With respect to coupling to a workstation, if it is desired that the base 212 not be movable, then the body 274 of the base 212 may be directly mounted to a workstation, such as be the use of screws or other suitable fasteners. Alternatively, the base 212 could include a mounting plate 282, which could be mounted to the workstation directly, or via a track that permits forward and rearward movement of the second example support arm 210. In still a further alternative, the mounting plate 282 may be a swivel plate that permits the support arm 210 to swivel in place, such as is shown in the first example, or to further be mounted via a track that additionally permits fore and aft movement and swiveling of the support arm.

It will be appreciated from FIGS. 33, 35 and 36 that the locking assembly 228 of the second example articulating support arm 210 may be easily and conveniently unlocked. As seen in FIG. 36, when a forward edge of the platform 42 is tilted upward, pivoting about the pivot shaft 43, the plunger 240 that is pivotally connected to the platform 42 at the further pivot shaft 45 is moved forward relative to the control head 226, and therefore, pulls the brake elements 236, 236' forward. This unlocks the pivotal connection of the second control arms 20, 20', and consequently both the first and second sets of control arms 14, 14', 20, 20' are free to pivot, and the support arm 210 may then be moved to a selected position with the control head 226 at or between a fully raised position and a fully lowered position. Accordingly, as seen in FIG. 35, when the front edge of the platform 42 is released and gravity or other objects on the platform 42 tend to tilt the front edge of the platform 42 downward to a rest position, the plunger 240 pushes the brake elements 236, 236' rearward and into engagement with the brake elements 34, 34' on the opposed surfaces of the distal ends 24, 24' of the second set of control arms 20, 20', locking the brake elements 34, 34', 236, 236' rotationally.

The second example support arm 210 shown in FIGS. 30-36, having a control head 226, base 212 and the associated plunger 240 and breaking elements includes the same functional components within the control arms as are shown in FIGS. 12-14 and 21-24 and described in detail above, and operates in a manner similar to the first example support arm 10. As previously noted, for cost effectiveness, the arms are shown including a universal structure for the basic configuration, but the arms need not share structural aspects, and various materials and forms of connection may be employed. Also, the second example articulating ergonomic support arm 210 includes the tilt adjustment components described with respect to the first example support arm 10, bearing the same reference numbers and permitting the previously described adjustment of the orientation of the platform 42 relative to a horizontal plane.

Figure 34:
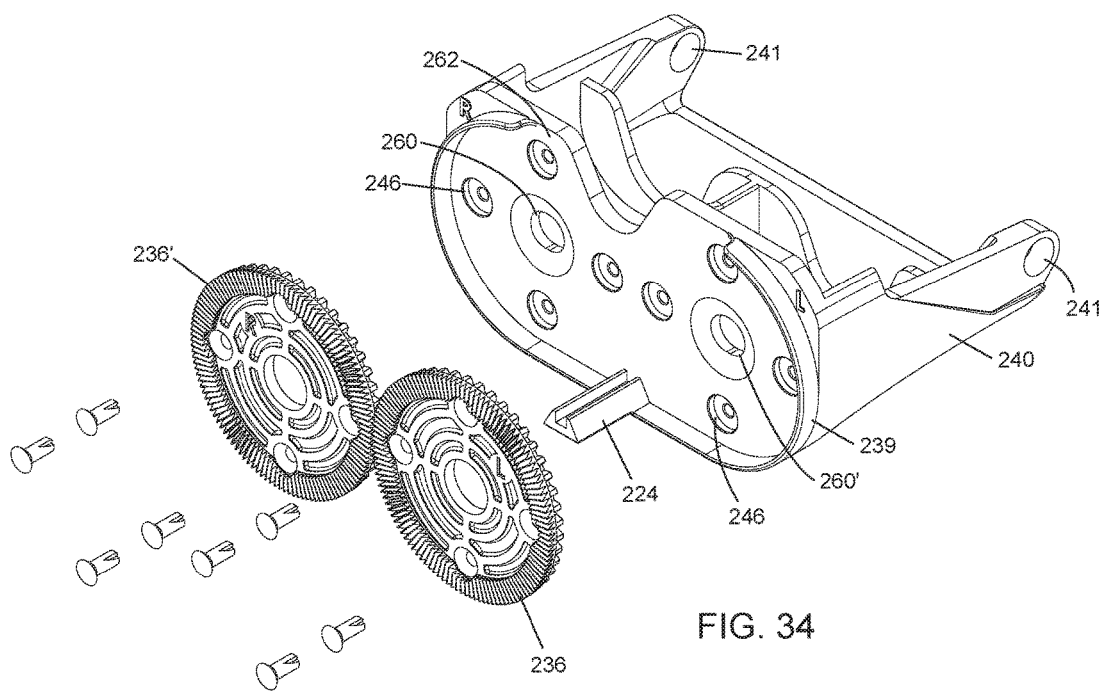
FIG. 34 is rear perspective partially exploded view of a plunger of the example articulating support arm shown in FIG. 30.

The second example articulating ergonomic support arm 210 shown and described may be adjusted to position the platform 42 for use or stowage, and if connected to a slide, may be stowed below a workstation, while the tilt adjustment or orientation of the platform 42 relative to a horizontal plane and to the control head 226 may be separately adjusted, if desired. The support arm 210 may include further components to enhance the appearance and safety of the device, such as a front shroud 116 to cover the tilt adjustment assembly 100 as seen in FIGS. 30 and 33, a shroud 218 that is integrally formed with the control head 226 to close the top of the control head 226 as seen in FIG. 30, a cover 120 that connects to the base 12 and covers the forward faces and potential pinch points of the proximal ends 16, 16' of the first set of control arms 14, 14' as seen in FIGS. 30 and 33, covers 222, 222' that close the front face of the proximal ends 22, 22' of the second set of control arms 20, 20' as seen in FIGS. 30 and 33, and a shroud 224 that closes the area between the distal ends 24, 24' of the second set of control arms 20, 20' at the plunger 240 as seen in FIG. 34. As noted with respect to the first example support arm 10, in the second example support arm 210 these components may be constructed of suitable materials, such as cast metal, sheet metal, molded plastics, or the like, and may be incorporated into adjacent components or separately connected to the assembly.

It will be appreciated that the disclosed examples described present numerous potential combinations of elements for articulating ergonomic support arms and methods of their use. Thus, while the present disclosure shows and describes various example support arms that may be adapted for connection to a workstation and for use with data entry/input devices, such as a keyboard, the examples are merely illustrative and are not to be considered limiting. Indeed, it will be apparent to those of ordinary skill in the art that various articulating support arms may be constructed and configured for use in supporting one or more data entry/input devices, without departing from the scope or spirit of the present disclosure. Thus, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

I claim:

1. An articulating support arm comprising:
a base,
a first set of control arms having proximal ends and distal ends;
the proximal ends of the first set of control arms being pivotally connected to the base;
a second set of control arms having proximal ends and distal ends;
the proximal ends of the second set of control arms being disposed forward of and pivotally connected to the distal ends of the first set of control arms;
the distal ends of the second set of control arms being pivotally connected to a control head; and
wherein the control head is vertically moveable so as to be disposed above, below and aligned with the base.

2. The articulating support arm of claim 1, wherein the proximal ends of the first set of control arms further comprise radially positioned teeth with an intermeshing of the teeth of the respective proximal ends of the first set of control arms, and the distal ends of the second set of control arms further comprising radially positioned teeth with an intermeshing of the teeth of the respective distal ends of the second set of control arms.

3. The articulating support arm of claim 2, wherein the radially positioned teeth on the proximal ends of the first set of control arms further comprise at least a sector of radially positioned teeth and the radially positioned teeth on the distal ends of the second set of control arms further comprise at least a sector of radially positioned teeth.

4. The articulating support arm of claim 1, further comprising a locking assembly that selectively prevents pivotal movement of the first and second set of control arms.

5. The articulating support arm of claim 4, wherein the locking assembly further comprises forward facing brake elements on the distal ends of the second set of control arms and rearward facing brake elements coupled to the control head.

6. The articulating support arm of claim 1, further comprising a platform pivotally connected to the control head.

7. The articulating support arm of claim 6, further comprising a tilt adjustment assembly by which the platform is selectively tiltable relative to the control head.

8. The articulating support arm of claim 7, wherein the platform further comprises an angled abutment that engages a slider extending between the angled abutment and a shaft that is rotatably connected to the control head, with the slider being rotatably connected to and driven by the shaft.

9. The articulating support arm of claim 8, wherein the shaft and the slider have corresponding screw threads thereon and the slider being rotatably connected to the shaft causes the slider to move linearly along the shaft when the shaft is rotated relative to the slider.

10. The articulating support arm of claim 8, wherein the slider has an upper portion that engages the shaft and a lower portion that engages the angled abutment on the platform.

11. The articulating support arm of claim 10, wherein the lower portion of the slider and the angled abutment have complementary angled surfaces that slidably engage each other and cause the platform to tilt as the slider moves along the shaft and the complementary angled surfaces of the lower portion and the angled abutment cause displacement of the platform relative to the shaft.

12. The articulating support arm of claim 8, wherein the platform is pivotally connected to the control head by a pin that is parallel to the shaft.

13. The articulating support arm of claim 12, wherein the slider has an upper portion that engages the shaft and the slider has a lower portion that slidably engages the pin.

14. The articulating support arm of claim 13, wherein the slider upper portion also extends from the shaft to the pin and slidably engages the pin.

15. The articulating support arm of claim 8, further comprising a tilt indicator on the slider and being visible through a window in the control head.

16. The articulating support arm of claim 1, further comprising a mounting plate connected to the base.

17. The articulating support arm of claim 16, wherein the mounting plate is pivotally connected to the base.

18. The articulating support arm of claim 1, wherein the control head is disposed forward of the distal ends of the second set of control arms and the proximal ends of the first set of control arms are disposed forward of the base.

19. The articulating support arm of claim 1, further comprising first resilient members coupled to the first and second sets of control arms and tending to bias the first and second sets of control arms to move the control head upward.

20. The articulating support arm of claim 19, wherein the first resilient members are disposed between the distal ends of the first set of control arms and the proximal ends of the second set of control arms.

21. The articulating support arm of claim 20, wherein each first resilient member further comprises a torsional coiled spring.

22. The articulating support arm of claim 19, wherein the first resilient members are disposed within hubs that are disposed between the distal ends of the first set of control arms and the proximal ends of the second set of control arms.

23. The articulating support arm of claim 4, further comprising a plunger coupled to the control head and wherein the locking assembly further comprises rearward facing brake elements located on the plunger, with the plunger being selectively movable toward and away from forward facing brake elements on the distal ends of the second set of control arms.

24. The articulating support arm of claim 23, wherein the plunger is pivotally connected to the platform.

25. The articulating support arm of claim 24, wherein when the front edge of the platform is pivoted downward to a rest position relative to the control head, the platform moves the rearward facing brake elements on the plunger rearward so as to lockingly engage the forward facing brake elements on the distal ends of the second set of control arms.

26. The articulating support arm of claim 24, wherein when the front edge of the platform is pivoted upward the platform moves the rearward facing brake elements on the plunger forward so as to release from locking engagement with the forward facing brake elements on the distal ends of the second set of control arms, wherein the articulating support arm is vertically movable.

27. The articulating support arm of claim 24, wherein the distal ends of the second set of control arms being pivotally connected to the control head includes respective pivot shafts that extend through the control head, the distal ends of the second set of control arms and the plunger.

28. The articulating support arm of claim 27, further comprising first fasteners that are connected to the pivot shafts and retained within the distal ends of the second set of control arms.

29. The articulating support arm of claim 27, further comprising resilient fasteners that are connected to the pivot shafts and bias the plunger rearward.

30. The articulating support arm of claim 1, wherein the control head is movable to different vertical positions relative to the base while the platform maintains a substantially similar angular orientation relative to a horizontal plane.

31. The articulating support arm of claim 1, wherein each control arm of the first set of control arms further comprises an internal channel that slidably receives a positioning rod, and the positioning rods received within the first set of control arms temporarily resist downward pivoting of the first set of control arms when the control head is being lowered or raised and is passing through a position wherein the control head is aligned with the base.

32. The articulating support arm of claim 31, wherein the internal channels further receive second resilient members that bias the positioning rods toward the distal ends of the first set of control arms.

33. The articulating support arm of claim 31, further comprising hubs connected to the proximal ends of the second set of control arms, wherein the hubs are disposed between the distal ends of the first set of control arms and the proximal ends of the second set of control arms.

34. The articulating support arm of claim 33, wherein each hub further comprises a cam that engages one of the positioning rods.

* * * * *